(12) United States Patent
Iino

(10) Patent No.: US 11,159,109 B2
(45) Date of Patent: Oct. 26, 2021

(54) CONTROL DEVICE FOR VIBRATION GENERATION DEVICE, ELECTRONIC APPARATUS, AND METHOD OF CONTROLLING VIBRATION GENERATION

(71) Applicant: SEIKO INSTRUMENTS INC., Chiba (JP)

(72) Inventor: Akihiro Iino, Chiba (JP)

(73) Assignee: SEIKO INSTRUMENTS INC.

( * ) Notice: Subject to any disclaimer, the term of this patent is extended or adjusted under 35 U.S.C. 154(b) by 0 days.

(21) Appl. No.: 15/837,955

(22) Filed: Dec. 11, 2017

(65) Prior Publication Data

US 2018/0175759 A1   Jun. 21, 2018

(30) Foreign Application Priority Data

Dec. 16, 2016 (JP) .............................. JP2016-244237
Oct. 18, 2017 (JP) .............................. JP2017-201984

(51) Int. Cl.
*H02K 33/00* (2006.01)
*H02K 7/075* (2006.01)
(Continued)

(52) U.S. Cl.
CPC .............. *H02P 7/05* (2016.02); *H02K 7/061* (2013.01); *H02P 1/028* (2013.01); *H02P 3/10* (2013.01);
(Continued)

(58) Field of Classification Search
CPC ......... H02K 21/24; H02K 1/02; H02P 25/032
See application file for complete search history.

(56) References Cited

U.S. PATENT DOCUMENTS

2006/0138885 A1* 6/2006 Uchiumi ................ H02K 7/065
                                                    310/81
2012/0229401 A1* 9/2012 Birnbaum ............... G06F 3/016
                                                    345/173
(Continued)

FOREIGN PATENT DOCUMENTS

CN          1707533         12/2005
CN          1754296         3/2006
(Continued)

OTHER PUBLICATIONS

Chinese Office Action dated Aug. 5, 2020 in Application No. 201711338391.8 together with English-language machine translation.

(Continued)

*Primary Examiner* — Kawing Chan
*Assistant Examiner* — Charles S Laughlin
(74) *Attorney, Agent, or Firm* — Adams & Wilks

(57) ABSTRACT

A vibration generation device includes a stator, and a rotor rotatable around a predetermined axis with respect to the stator and having a weight having a gravity center at a position shifted from the predetermined axis. A control section controls a start-up period maximum voltage value, which is a maximum voltage value of a drive signal to be applied to the vibration generation device in a start-up period, to become larger than a steady operation period voltage value, which is a voltage value of the drive signal to be applied to the vibration generation device in a steady operation period. The control section selects at least one of a plurality of voltage values as the steady operation period voltage value and sets the duration of the start-up period based on the steady operation period voltage value selected.

8 Claims, 17 Drawing Sheets

(51) Int. Cl.

| | | |
|---|---|---|
| *H02P 6/17* | (2016.01) | |
| *H02P 7/03* | (2016.01) | |
| *H02P 25/032* | (2016.01) | |
| *H02K 7/06* | (2006.01) | |
| *H02P 3/12* | (2006.01) | |
| *H02P 1/02* | (2006.01) | |
| *H02P 3/10* | (2006.01) | |
| *H02P 6/30* | (2016.01) | |

(52) U.S. Cl.
CPC ............... *H02P 3/12* (2013.01); *H02P 6/30* (2016.02); *H02P 25/032* (2016.02)

(56) References Cited

U.S. PATENT DOCUMENTS

2013/0307441 A1* 11/2013 Schuster ............... B06B 1/023
                                                    318/127
2015/0288248 A1* 10/2015 Yamaguchi ........... H02K 7/063
                                                    310/81

FOREIGN PATENT DOCUMENTS

| CN | 101189789 | 5/2008 |
| CN | 102437806 | 5/2012 |
| JP | 46081312 | 10/1973 |
| JP | 57028587 | 2/1982 |
| JP | 06225557 | 8/1994 |
| JP | 8320384 | 12/1996 |
| JP | 2000042491 | 2/2000 |
| JP | 2006166678 | 6/2006 |
| JP | 2016007114 | 1/2016 |

OTHER PUBLICATIONS

King J. et al., "Motorola Technical Developments" vol. 11 Vibrator Motor Bracket Used Multifunctionally as Negative Cell Fixed Contact Oct. 1, 1990.

Tian Guocheng et al., "Noise and Vibration Diagnosis and Treatment of 300MW Generator Stator", Shandong Electric Power Technology, No. 2, Mar. 30, 2000, together with English-language abstract.

Notice of Reasons for Rejection together with English-language machine translation dated Apr. 20, 2021 in Japanese Application No. 2017-201984.

* cited by examiner

CONTROL DEVICE FOR VIBRATION GENERATION DEVICE, ELECTRONIC APPARATUS, AND METHOD OF CONTROLLING VIBRATION GENERATION

FIELD OF THE INVENTION

The present invention relates to a control device for a vibration generation device, an electronic apparatus, and a method of controlling a vibration generation device.

Priority is claimed on Japanese Patent Application No. 2016-244237, filed on Dec. 16, 2016, and Japanese Patent Application No. 2017-201984, filed on Oct. 18, 2017, the contents of which are incorporated herein by reference.

BACKGROUND ART

In the information equipment such as a cellular phone or a tablet PC, there are used vibrations as measures for transmitting information such as incoming, mail reception, and alarm notification to the user. Further, in recent years, vibrations are used as measures for transmitting a variety of types of information to the user also in a touch panel display or the like used in AV equipment, gaming equipment, a bank ATM (automatic teller machine), and so on.

As the vibration generation device, there is adopted, for example, a vibration motor (see, e.g., JP-A-2016-007114). In general, the vibration motor is provided with a stator, and a rotor having a shaft and a weight. The weight has the gravity center at a position shifted from the central axis of the shaft. In the vibration motor, the rotor rotates to cause the centrifugal action of the weight with the gravity center shifted, and thus, the vibration is generated.

Further, in recent years, there have increased the chances of providing a function of a button to the surface of a variety of types of display in smartphones, on-vehicle devices, and so on. In this case, since it is difficult for the user to judge whether or not the button is pressed (set to the ON state), it has been getting started to propagate the vibration to the finger in order to notify the user of the fact that the button has been pressed. Further, it has been getting frequent to generate vibrations in accordance with a music or a variety of sounds in a smartphone, or transmit a variety of types of information with vibrations also in a game machine or a virtual reality device.

However, in the control of the vibration motor in the related art, there exists room for improvement in terms of improving the responsivity in order to promptly transmit the information to the user with the vibration.

The invention is made in view of the problem described above, and has an object of providing a control device for a vibration generation device, an electronic apparatus, and a method of controlling a vibration generation device each superior in responsivity to the related art.

SUMMARY OF THE INVENTION

In order to achieve the object described above, the present invention adopts the following measures.

(1) A control device (40) for a vibration generation device according to an aspect of the invention includes a vibration generation device (a vibration motor 70, 201, 301, 401) including a stator (71, 202, 302), and a rotor (72, 203, 303, 403) provided so as to be able to rotate around a predetermined axis with respect to the stator, and having a weight (74, 233, 333, 433) having a gravity center at a position shifted from the predetermined axis, and a control section (a control section 50, a drive section 60) adapted to control a start-up period maximum voltage value, which is a maximum voltage value of a drive signal to be applied to the vibration generation device in a start-up period, to become larger than a steady operation period voltage value, which is a voltage value of the drive signal to be applied to the vibration generation device in a steady operation period.

(2) Further, in the control device for the vibration generation device according to the above (1), it is possible to arrange that the control section controls a first application time, during which the start-up period maximum voltage value is applied to the vibration generation device, to become shorter than a second application time, during which the steady operation period voltage value is applied to the vibration generation device.

(3) Further, in the control device for the vibration generation device according to the above (1) or (2), it is possible to arrange that the control section applies a reverse rotation signal for making the vibration generation device perform a reverse rotation operation in succession to the steady operation to the vibration generation device, and controls a reverse rotation period maximum voltage value, which is a maximum voltage value of the reverse rotation signal, to become larger than the steady operation period voltage value.

(4) Further, in the control device for the vibration generation device according to any one of the above (1) to (3), it is possible to arrange that a reverse rotation signal for making the vibration generation device perform a reverse rotation operation in succession to the steady operation is applied to the vibration generation device, a reverse rotation period maximum voltage value being a maximum voltage value of the reverse rotation signal, and the control section is capable of selecting a plurality of the steady operation period voltage values, and sets at least one of the start-up period maximum voltage value and the reverse rotation period maximum voltage value in accordance with the steady operation period voltage value selected.

(5) Further, in the control device for the vibration generation device according to the above (2), it is possible to arrange that the control section is capable of selecting a plurality of the steady operation period voltage values, and sets at least one of the first application time and the second application time in accordance with the steady operation period voltage value selected.

(6) Further, in the control device for the vibration generation device according to any one of the above (1) to (3), it is possible to arrange that a reverse rotation signal for making the vibration generation device perform a reverse rotation operation in succession to the steady operation is applied to the vibration generation device, a reverse rotation period maximum voltage value being a maximum voltage value of the reverse rotation signal, and the control section is capable of selecting a plurality of the steady operation period voltage values, and sets at least one of the start-up period maximum voltage value, the reverse rotation period maximum voltage period, a first application time, during which the start-up period maximum voltage value is applied to the vibration generation device, and a second application time, during which the steady operation period voltage value is applied to the vibration generation device, in accordance with the steady operation period voltage value selected.

(7) Further, in the control device for the vibration generation device according to any one of the above (1) to (6), it is possible to arrange that a reverse rotation signal for making the vibration generation device perform a reverse rotation operation in succession to the steady operation is applied to the vibration generation device, a reverse rotation period maximum voltage value being a maximum voltage value of the reverse rotation signal, and the control section steps up and then sets at least one of the start-up period maximum voltage value and the reverse rotation period maximum voltage value to a voltage value higher than a voltage value of, a power supplied to the control section.

(8) Further, in the control device for the vibration generation device according to an any one of the above (1) to (7), it is possible to arrange that the control section controls the drive signal to be applied to the vibration generation device to change to a first voltage value larger than the steady operation period voltage value, to change to a second voltage value larger than the first voltage value after having been changed to the first voltage value, and to change from the second voltage value to the first voltage value after having been changed to the second voltage value in the start-up period, and to change from the first voltage value to the steady operation period voltage value in the steady operation period, and the control section controls the drive signal to be applied to the vibration generation device to change from the steady operation period voltage value to a third voltage value, to change to a fourth voltage value lower than the third voltage value after having been changed to the third voltage value, and to change to a fifth voltage value lower than the third voltage value and higher than the fourth voltage value after having been changed to the fourth voltage value in the reverse rotation operation period.

(9) Further, in the control device for the vibration generation device according to any one of the above (1) to (3) and (7), it is possible to arrange that in the drive signal to be applied to the vibration generation device in the start-up period, the voltage value to be applied first is lower than the start-up period maximum voltage value.

(10) Further, in the control device for the vibration generation device according to anyone of the above (1) to (3), it is possible to arrange that in the drive signal to be applied to the vibration generation device in the start-up period, the voltage value to be applied first is one of equal to the steady operation period voltage value and higher than the steady operation period voltage value.

(11) Further, in the control device for the vibration generation device according to any one of the above (1), (2), (5), (9), and (10), it is possible to arrange that the control section shorts both ends of the vibration generation device for a predetermined period of time in a case of making the vibration generation device perform a reverse rotation operation in succession to the steady operation.

(12) Further, in the control device for the vibration generation device according to any one of the above (1), (2), (5), (9), and (10), it is possible to arrange that the control section shorts both ends of the vibration generation device for a predetermined period of time before making the vibration generation device perform a reverse rotation operation in succession to the steady operation.

(13) Further, in the control device for the vibration generation device according to any one of the above (1) to (7), (9), and (10), it is possible to arrange that the control section shorts both ends of the vibration generation device for a predetermined period of time after making the vibration generation device perform a reverse rotation operation in succession to the steady operation.

(14) An electronic apparatus according to anyone of the above (1) to (13) includes any one of the control devices for the vibration generation device described above.

(15) A method of controlling a vibration generation device according to an aspect of the invention is a method of controlling rotation of the vibration generation device including a stator, and a rotor provided so as to be able to rotate around a predetermined axis with respect to the stator, and having a weight having a gravity center at a position shifted from the predetermined axis, the method including the step of controlling a start-up period maximum voltage value, which is a maximum voltage value of a drive signal to be applied to the vibration generation device in a start-up period, to become larger than a steady operation period voltage value, which is a voltage value of the drive signal to be applied to the vibration generation device in a steady operation period.

According to an aspect of the invention, it is possible to increase the start-up torque of the vibration generation device to shorten the time until the rotation frequency in the steady operation of the vibration generation device is reached.

Further, according to an aspect of the invention, it becomes possible to rapidly stop the vibration generation device, and it is possible to propagate the lively vibration to the user. Further, according to an aspect of the invention, it is possible to generate a variety of vibration patterns using the vibrations of the vibration generation device.

Further, according to an aspect of the invention, it is possible to generate the vibrations high in responsivity in accordance with a variety of vibration patterns.

Further, according to an aspect of the invention, it is possible to obtain an advantage of improving the responsivity (start-up, stoppage).

Further, according to an aspect of the invention, it is possible to smoothly stop the reverse rotation operation.

DETAILED DESCRIPTION OF THE INVENTION

An embodiment of the invention will hereinafter be described with reference to the drawings.

Figure 1:
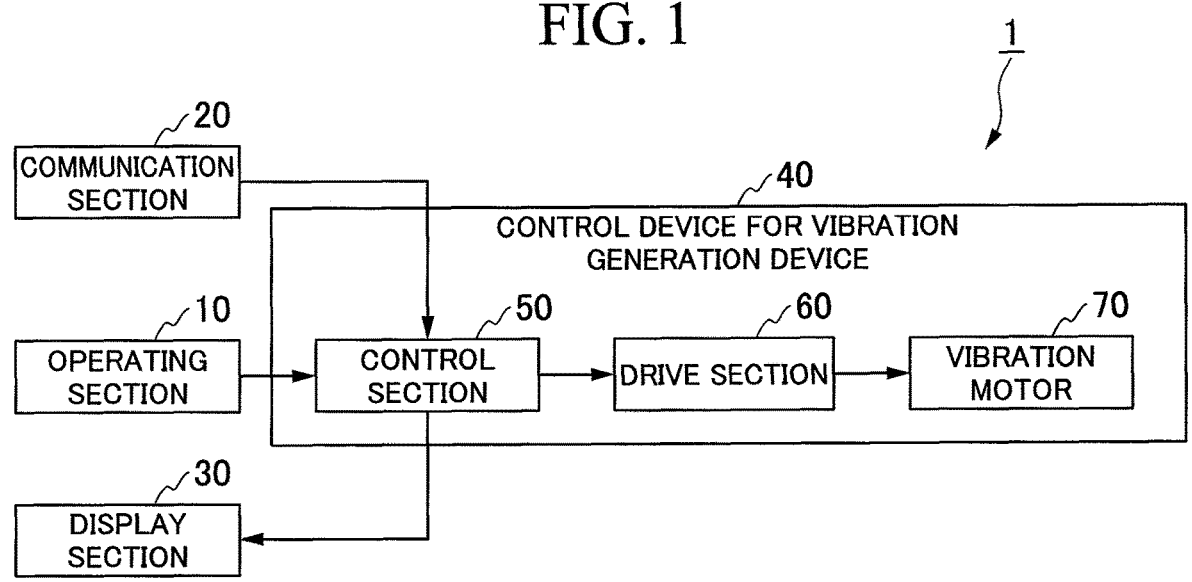
FIG. 1 is a block diagram showing a configuration example of an electronic apparatus including a control device for a vibration generation device according to the embodiment.

FIG. 1 is a block diagram showing a configuration example of an electronic apparatus 1 including a control device 40 for a vibration generation device according to the present embodiment. It should be noted that the description will be presented citing the cellular phone as an example of the electronic apparatus 1, but it is also possible for the electronic apparatus to be a wearable terminal, a tablet terminal, portable game equipment, AV equipment, on-vehicle equipment, a bank ATM, or the like.

As shown in FIG. 1, the electronic apparatus 1 is provided with an operating section 10, a communication section 20, a display section 30, and a control device 40 for a vibration generation device. The control device 40 for the vibration generation device is provided with a control section 50 (a control section), a drive section 60 (a drive section), and a vibration motor 70 (a vibration generation device).

The operating section 10 is, for example, a touch panel sensor disposed on the display section 30 or operation buttons. The operating section 10 detects the result of the operation by the user, and outputs the operation result thus detected to the control section 50 of the control device 40 for the vibration generation device.

The communication section 20 receives a radio wave, then converts the radio wave thus received into an electric signal, and then outputs the electric signal thus converted to the control device 40 for the vibration generation device as a reception signal. Further, the communication section 20 converts a transmission signal output by the control section 50 into a radio wave, and then transmits the radio wave.

The display section 30 is, for example, a liquid crystal display device, or an organic EL (electroluminescence) display device. The display section 30 displays an image signal output by the control section 50.

The control device 40 for the vibration generation device drives the vibration motor 70 in accordance with the operation result output by the operating section 10, the reception signal received by the communication section 20, and so on. The control device 40 for the vibration generation device generates the image signal in accordance with the operation result output by the operating section 10, and then outputs the image signal thus generated to the display section 30. The control device for the vibration generation device generates the transmission signal based on the information to be transmitted, and then outputs the transmission signal thus generated to the communication section 20.

The control section 50 outputs a drive instruction for driving the vibration motor 70 to the drive section 60 in accordance with the operation result output by the operating section 10. The control section 50 outputs an instruction for driving the vibration motor 70 to the drive section 60 in accordance with the reception signal received by the communication section 20 and so on. The control section 50 generates the image signal in accordance with the operation result output by the operating section 10, and then outputs the image signal thus generated to the display section 30. The control section 50 generates the transmission signal in accordance with, for example, the operation result output by the operating section 10, and then outputs the transmission signal thus generated to the communication section 20.

The control drive section 60 generates the drive signal in accordance with the drive instruction output by the control section 50, and then supplies the drive signal thus generated to the vibration motor 70. It should be noted that the drive section 60 has a step-up circuit, and is capable of generating the drive signal higher than a power supply voltage supplied. It should be noted that the drive signal will be described later.

The vibration motor 70 is driven by the drive signal supplied by the drive section 60. It should be noted that the configuration example of the vibration motor 70 will be described later.

Figure 2:
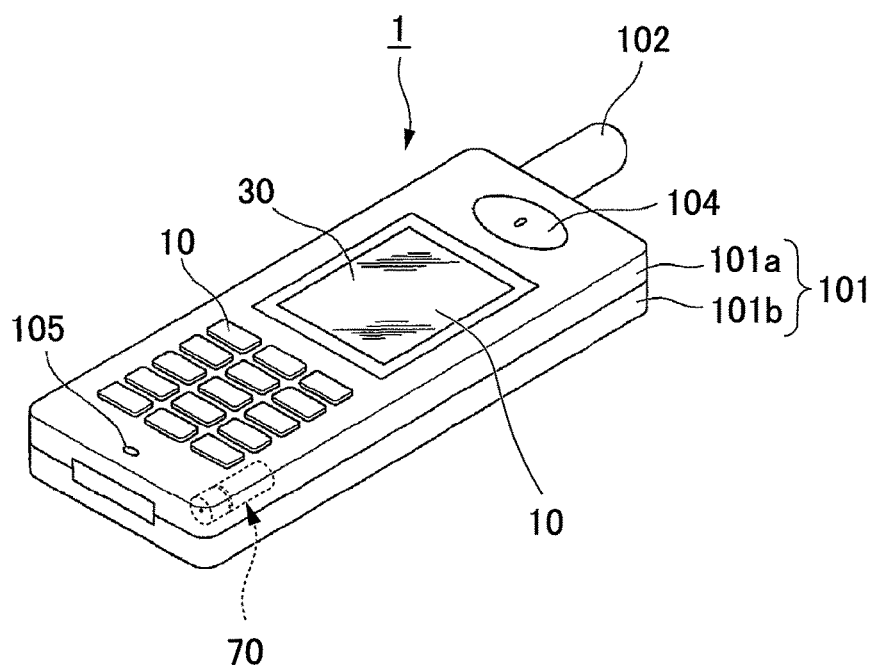
FIG. 2 is a perspective view of the electronic apparatus equipped with a vibration motor.

FIG. 2 is a perspective view of the electronic apparatus 1 equipped with the vibration motor 70.

The electronic apparatus 1 shown in FIG. 2 is an example of the electronic apparatus using the vibration motor 70. As shown in FIG. 2, the electronic apparatus 1 is provided with a housing 101 having a roughly rectangular parallelepiped shape formed of an upper case 101a and a lower case 101b combined with each other, and an antenna 102 disposed so as to project on a side surface in the longitudinal direction of the housing 101.

The upper case 101a of the housing 101 is provided with a speaker 104, the operating section 10, the display section 30, and a microphone 105. The lower case 101b is provided with a power supply not shown formed of a secondary cell or the like.

Inside the housing 101, there is disposed the vibration motor 70. The vibration motor 70 is mounted on a circuit board not shown having a control section in, for example, the lower case 101b. Due to this configuration, it is possible for the electronic apparatus 1 to transmit the information such as incoming, mail reception, and alarm notification, and the confirmation when touching the panel with a finger to the user as the vibration of the vibration motor 70.

Then, an example of the drive signal and the rotation frequency of the vibration motor 70 in the present embodiment will be described.

Figure 3:
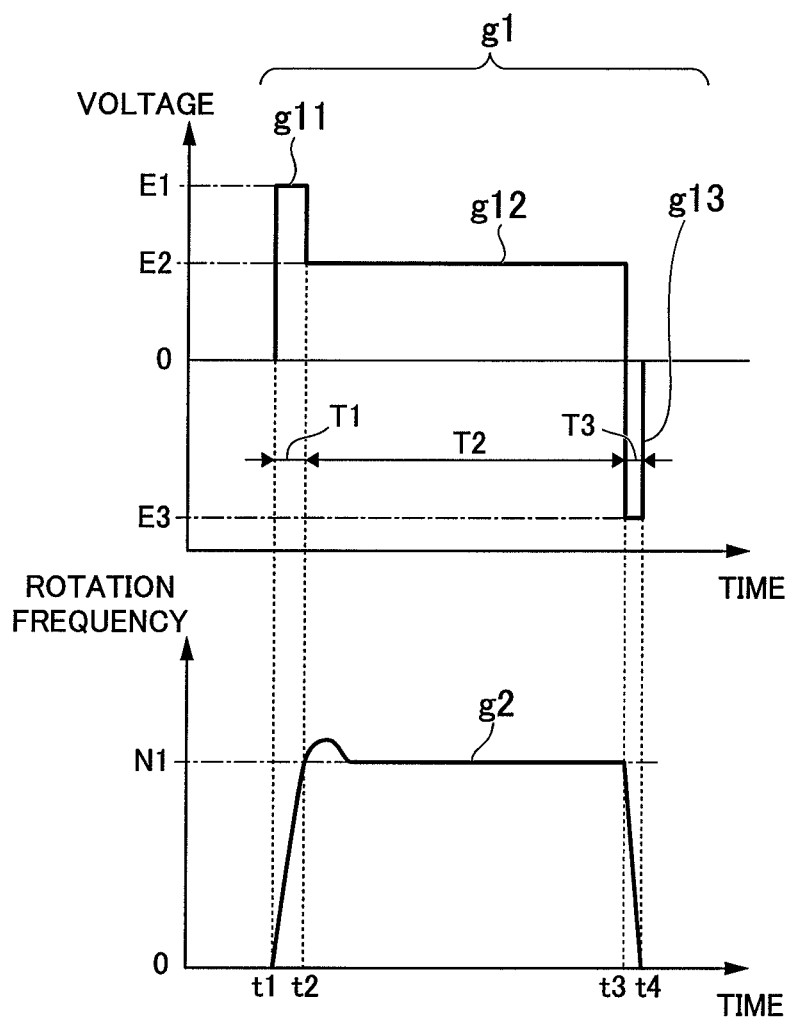
FIG. 3 is a diagram showing an example of a drive signal and the rotation frequency of the vibration motor according to the embodiment.

FIG. 3 is a diagram showing an example of the drive signal and the rotation frequency of the vibration motor 70 according to the present embodiment. In FIG. 3, the horizontal axis represents time, and the vertical axes represent voltage and rotation frequency, respectively. The waveform g1 represents a temporal variation of the drive signal. The waveform g2 represents a temporal variation of the rotation frequency of the vibration motor 70. Further, the drive signal is configured including the waveform g11 as a start-up signal, the waveform g12 as a rotary drive signal, and the waveform g13 as a brake signal (a reverse rotation signal).

As represented by the waveform g1, the drive section 60 outputs the electrical power with the voltage value of E1 (a start-up period maximum voltage value) during the period (T1) from the time t1 to the time t2. Here, the voltage value E1 is higher than the power supply voltage value supplied to the drive section 60.

Subsequently, the drive section 60 outputs the electrical power with the voltage value of E2 (a steady operation period voltage value) during the period (T2) from the time t2 to the time t3. It should be noted that the voltage value E2 is smaller than the voltage value E1. Further, the period from the time t1 to the time t2 is shorter than the period from the time t2 to the time t3.

Subsequently, the drive section 60 outputs the electrical power with the voltage value of E3 (a reverse rotation period maximum voltage value) during the period (T3) from the time t3 to the time t4. It should be noted that the absolute value of the voltage value E3 is larger than the voltage value E2. Further, the voltage value E3 is higher than the power supply voltage value supplied to the drive section 60.

It should be noted that the period from the time t1 to the time t2 is a period (a first application time) of start-up, and the drive signal during this period is also the start-up signal (the waveform g11). The period from the time t2 to the time t3 is a rotation period (a second application time), and the drive signal during this period is also the rotary drive signal (the waveform g12). The period from the time t3 to the time t4 is a stoppage period (a third application time), and the drive signal during this period is also the brake signal (the waveform g13). It should be noted that the first application time is shorter than the second application time. Further, the third application time is shorter than the second application time.

As represented by the waveform g2, the rotation frequency of the vibration motor 70 increases from 0 to N1 in the period from the time t1 to the time t2. After the time t2, the rotation frequency exceeds N1 once, and then becomes N1. Then, during the period to the time t3, the rotation frequency of the vibration motor 70 is kept at N1. In the period from the time t3 to the time t4, the rotation frequency of the vibration motor 70 decreases from N1 to 0. It should be noted that since the upper limit of the frequency sensed well by the human is around 150 Hz, the rotation frequency N1 is, for example, about 9000 rpm.

Here, as a comparative example, an example of the drive signal and the rotation frequency of a general vibration motor will be described.

Figure 4:
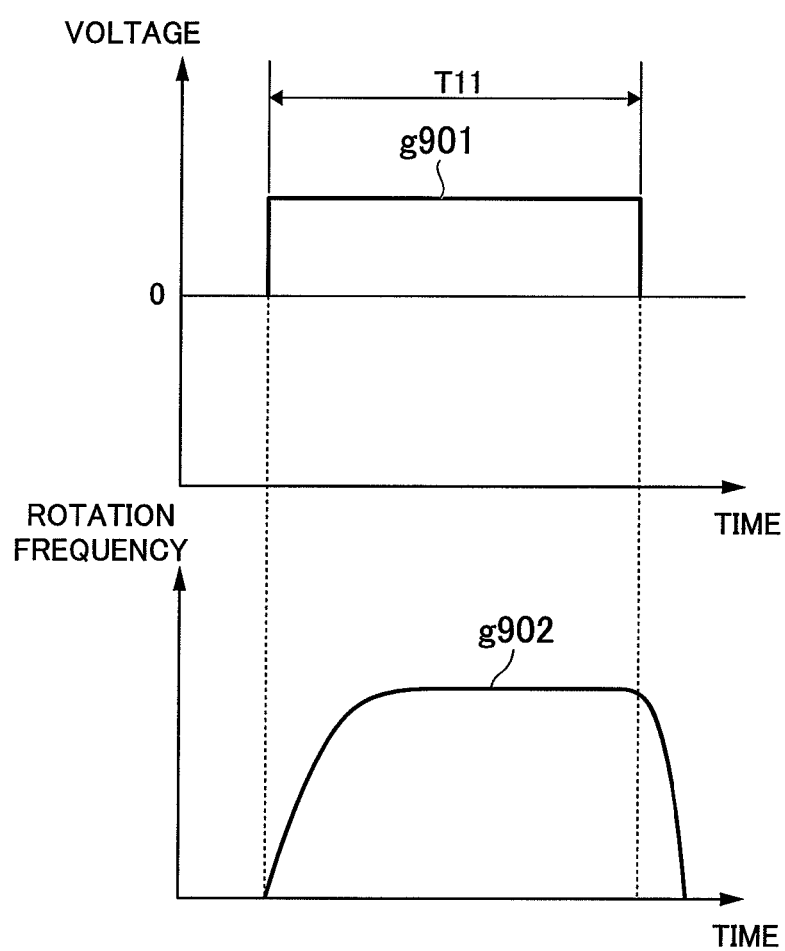
FIG. 4 is a diagram showing an example of a drive signal and the rotation frequency of the vibration motor according to a comparative example.

FIG. 4 is a diagram showing an example of the drive signal and the rotation frequency of the vibration motor of a comparative example. In FIG. 4, the vertical axes and the horizontal axis are the same as those in FIG. 3. The waveform g901 represents a temporal variation of the drive signal. The waveform g902 represents a variation of the rotation frequency of the vibration motor 70.

As shown in FIG. 4, in the past, the drive is supplied (see, e.g., JP-A-8-320384) to the vibration motor during the period T11 as represented by the waveform g901.

However, in the conventional drive method shown in FIG. 4, the responsivity in the start-up of the vibration, namely the rising responsivity, is bad as represented by the waveform g902. Further, as represented by the waveform g902, the responsivity when braking (when stopping), namely the falling responsivity, is bad. Therefore, since the sense of the vibration propagated to the hand does not rise promptly, but rises gradually, the user feels dull in some cases.

In contrast, according to the present embodiment, it is arranged that the start-up pulse (the waveform g11) with the voltage value of E1 is firstly supplied to the vibration motor 70, and then the rotary drive signal (the waveform g12) with the voltage value of E2 smaller than E1 is supplied. Thus, according to the present embodiment, it is possible to increase the start-up torque to shorten the time until the rotation frequency in the steady operation is reached.

Further, according to the present embodiment, since the absolute value of the voltage value E3 of the brake signal (the waveform g13) is made larger than the voltage value E2, it becomes possible to rapidly stop the vibration motor 70, and thus, it is possible to propagate a lively vibration to the user.

Here, the brake signal in the drive signal and the rotation frequency will further be described.

It should be noted that the vibration motor 70 is provided with a weight as described later.

The brake signal supplied by the drive section 60 to the vibration motor 70 is the reverse rotation signal having magnitude enough for the weight to make a reverse rotation. Here, the maximum rotation frequency of the rotation frequency of the reverse rotation of the weight is no higher than 3000 rpm, which is a third of the rotation frequency N1 (FIG. 3) in the rotation period, and is preferably no higher than 1000 rpm, namely no higher than a ninth thereof.

The reason that a third and a ninth are preferable is that it is possible to instantaneously stop the vibration motor 70, and it is preferable that the reverse rotation is not sensed by the human. The rotation frequency fulfilling such conditions is no higher than a third of the rotation frequency in the rotation period, and preferably no higher than a ninth thereof. The drive section 60 sets the voltage value E3 and the duration (from the time t3 to the time t4) of the brake signal so as to achieve such a rotation frequency. In this case, the control section 50 outputs the drive instruction including an instruction representing the fact that, for example, the rotation frequency of the brake signal is 1000 rpm.

It should be noted that it is also possible for the drive section 60 to make the user sense the vibration in the reverse rotation in addition to the vibration in the normal rotation by setting the maximum reverse rotation frequency of the vibration motor 70 to no lower than 6000 rpm, and preferably no lower than 9000 rpm in the brake signal. Further, it is also possible for the drive section 60 to make the reverse rotation operation time (from the time t3 to the time t4) shorter than the normal rotation operation time (from the time t2 to the time t3), and preferably equal to or shorter than a half of the normal rotation operation, and more preferably equal to or shorter than a third thereof.

Thus, according to the present embodiment, it is possible to generate a variety of vibration patterns. Specifically, according to the present embodiment, it is possible to provide the user with unconventional vibration patterns to thereby inform the user of an impact and specific information (e.g., an alert).

Modified Examples

Then, some modified examples of the drive signal will be described.

Figure 5:
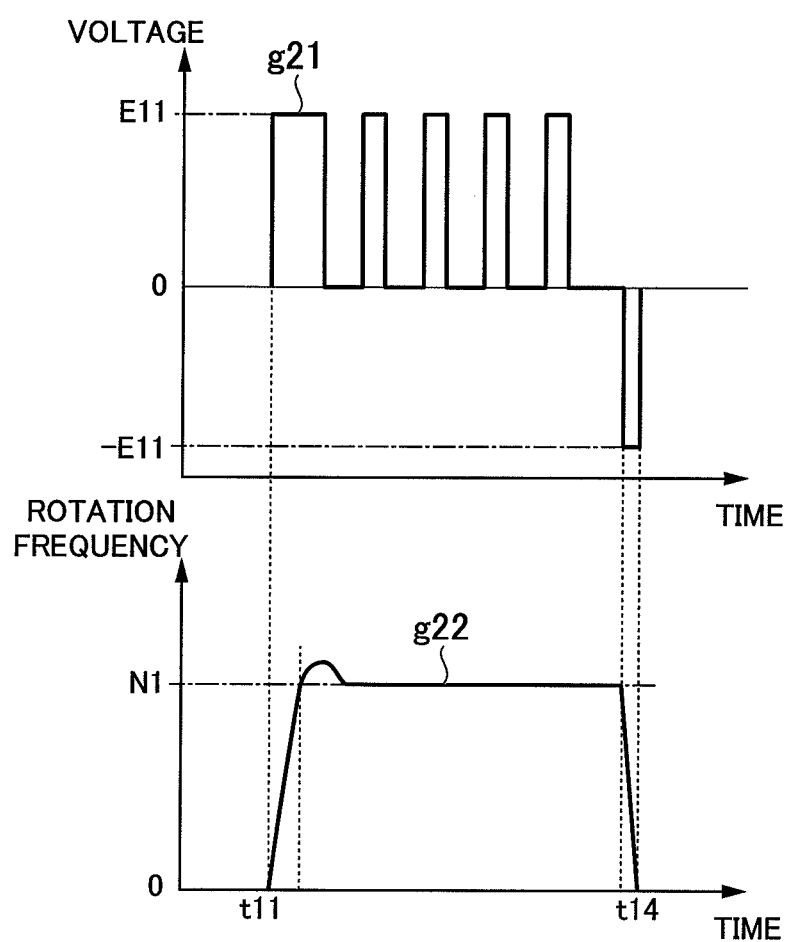
FIG. 5 is a diagram showing another example of the drive signal and the rotation frequency related to the embodiment.
Figure 6:
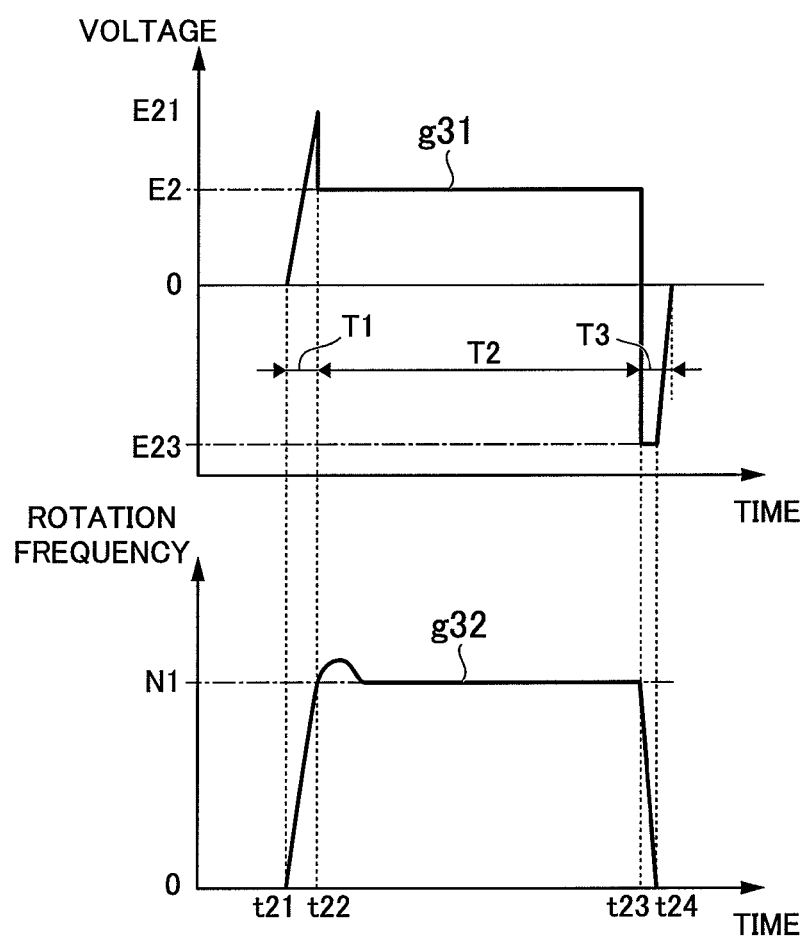
FIG. 6 is a diagram showing another example of the drive signal and the rotation frequency related to the embodiment.
Figure 7:
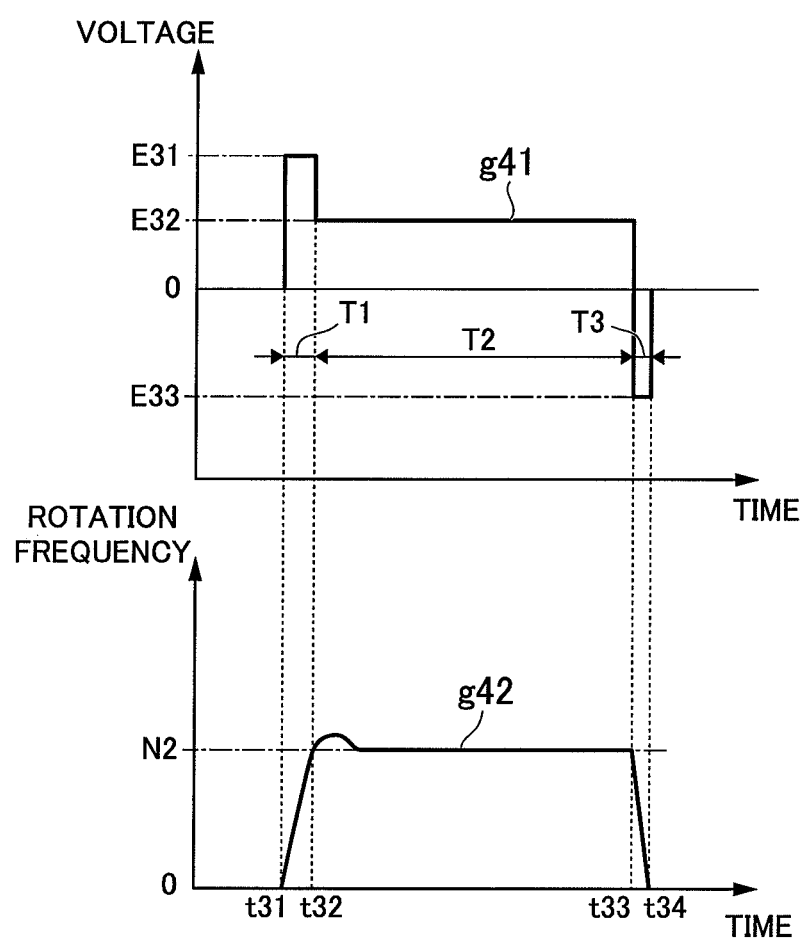
FIG. 7 is a diagram showing another example of the drive signal and the rotation frequency related to the embodiment.

FIG. 5 through FIG. 7 are each a diagram showing another example of the drive signal and the rotation frequency related to the present embodiment. In each of FIG. 5 through FIG. 7, the horizontal axis represents time, and the vertical axes represent voltage and rotation frequency, respectively. Further, the waveform g21, the waveform g31, and the waveform g41 each represent a temporal variation of the drive signal. The waveform g22, the waveform g32, and the waveform g42 each represent a temporal variation of the rotation frequency of the vibration motor 70.

The example shown in FIG. 5 is an example in which the drive signal is a PWM (pulse width modulation) signal. In the waveform g21, the pulse signal started at the time t11 corresponds to the start-up signal, and the pulse ending at the time t14 corresponds to the brake signal. Further, as represented by the waveform g21, the pulse width of the start-up signal is longer than each of the pulses in the rotation period. Further, the voltage value of the start-up signal is E11, and the voltage value of the brake signal is −E11. Thus, the start-up and the stoppage can quickly be performed similarly to the example shown in FIG. 3.

The example shown in FIG. 6 is an example in which the start-up signal and the brake signal each have a saw-tooth shape. As represented by the waveform g31, the start-up signal having a saw-tooth shape with the voltage value increasing from 0 to E21 is supplied to the vibration motor 70 during the period from the time t21 to the time t22. Further, the drive section 60 supplies the brake signal having a saw-tooth shape with the voltage value changing from E23 to 0 to the vibration motor 70 after the time t24. It should be noted that the voltage value E21 can be equal to the voltage value E1, or can also be larger than the voltage value E1. Further, the voltage value E21 can be equal to the voltage value E3, or can also be larger than the voltage value E3. Thus, the start-up and the stoppage can quickly be performed similarly to the example shown in FIG. 3.

The example shown in FIG. 7 is an example of the drive signal and the rotation frequency in the case in which the rotation frequency is lower than shown in FIG. 3. In this case, the voltage value E31 is larger than the voltage value E32. The absolute value of the voltage value E33 is smaller than the voltage value E32. Further, the voltage value E31 is smaller than the voltage value E1 (FIG. 3). The voltage value E32 is smaller than the voltage value E2. The absolute value of the voltage value E32 is smaller than the absolute value of the voltage value E3. Thus, the start-up and the stoppage can quickly be performed similarly to the example shown in FIG. 3.

It should be noted that in each of the examples shown in FIG. 5 through FIG. 7, it is also possible for the drive section 60 to make the user sense the vibration in the reverse rotation in addition to the vibration in the normal rotation by setting the maximum reverse rotation frequency of the vibration motor 70 to no lower than 6000 rpm, and preferably no lower than 9000 rpm in the brake signal. Further, it is also possible for the drive section 60 to make the period corresponding to the reverse rotation operation time (from the time t3 to the time t4; T1) shorter than the period corresponding to the normal rotation operation time (from the time t2 to the time t3; T2), and preferably equal to or shorter than a half of the normal rotation operation, and more preferably equal to or shorter than a third thereof.

Thus, it is possible to generate a variety of vibration patterns also in each of the examples shown in FIG. 5 through FIG. 7. Specifically, according to the present embodiment, it is possible to provide the user with unconventional vibration patterns to thereby inform the user of an impact and specific information (e.g., an alert).

It should be noted that it is possible for the control section 50 described above to select the value of the voltage value E2 during the rotation period in the drive instruction. For example, in the case in which the voltage value of the power supplied to the control section 50 and the drive section 60 is 3.7 V, the control section 50 selects at least one from voltage values of 3.7 V, 3.6 V, 3.5 V, . . . to make an instruction. Further, the control section 50 can also output a plurality of drive instructions in a row. Further, in the case in which the control signal is the PWM signal, it is possible for the control section 50 to select the time length of each of the pulse signals.

For example, in the case in which the control section 50 instructs the voltage value E2($i$) (i is an integer no smaller than 2) (the steady operation period voltage value) in the rotation period, namely 3.7 V(1), 3.5 V(2), . . . , 3.6 V(i) in a row, the voltage value E1($i$) (the start-up period maximum voltage value) of the start-up signal and the voltage value E3($i$) of the brake signal are each a value corresponding to the voltage value E2($i$). For example, the voltage values of the first drive signal are E1(1)=3.7 V×1.2 (times), E2(1)=3.7 V, E3(1)=3.7 V×1.1 (times), and the voltage values of the second drive signal are E1(2)=3.5 V×1.2, E2(2)=3.5 V, E3(2)=3.5 V×1.1. As described above, the control section 50 controls the voltage values so that the larger the value of the voltage value E2($i$) is, the larger the values of the voltage values E1($i$) and E3($i$) (the reverse rotation period maximum voltage value) become, and the smaller the value of the voltage value E2($i$) is, the smaller the values of the voltage values E1($i$) and E3($i$) become. It should be noted that in the example shown in FIG. 6, the voltage value E21 corresponds to the voltage value E1, and the voltage value E23 corresponds to the voltage value E3. Further, in the example shown in FIG. 7, the voltage value E31 corresponds to the voltage value E1, the voltage value E32 corresponds to the voltage value E2, and the voltage value E33 corresponds to the voltage value E3.

In the case in which the drive signal is the PWM signal, the control section 50 performs the control so that the larger the voltage value E2($i$) is, the longer the time length of the start-up signal and the time length of the brake signal become, and the smaller the voltage value E2($i$) is, the shorter the time length of the start-up signal and the time length of the brake signal become.

Further, the control section 50 is capable of selecting the value of the voltage value E2($i$) from two or more voltage values, and sets the value of the period (T1($i$); FIG. 3, FIG. 6, and FIG. 7) from the time t1 to the time t2 as the duration of the start-up signal, and the value of the period (T3($i$); FIG. 3, FIG. 6, and FIG. 7) from the time t3 to the time t4 as the duration of the brake signal based on the value of the voltage value E2($i$). Further, the control section 50 performs the control so that the larger the value of E2($i$) is, the larger the values of T1($i$) and T3($i$) become. It should be noted that in the example shown in FIG. 6, the voltage value E21 corresponds to the voltage value E1, and the voltage value E23 corresponds to the voltage value E3. Further, in the example shown in FIG. 7, the voltage value E31 corresponds to the voltage value E1, the voltage value E32 corresponds to the voltage value E2, and the voltage value E33 corresponds to the voltage value E3.

Further, it is also possible for the control section 50 to perform the control so that the larger the value of the voltage value E2(*i*) is, the larger the values of the voltage values E1(*i*) and E3(*i*) also become, and the longer the time length of the start-up signal and the time length of the brake signal become. Further, it is also possible for the control section 50 to perform the control so that the smaller the value of the voltage value E2(*i*) is, the smaller the values of the voltage values E1(*i*) and E3(*i*) also become, and the shorter the time length of the start-up signal and the time length of the brake signal become. It should be noted that in the example shown in FIG. 6, the voltage value E21 corresponds to the voltage value E1, and the voltage value E23 corresponds to the voltage value E3. Further, in the example shown in FIG. 7, the voltage value E31 corresponds to the voltage value E1, the voltage value E32 corresponds to the voltage value E2, and the voltage value E33 corresponds to the voltage value E3.

Here, another modified example of the drive signal will further be described.

Figure 8:
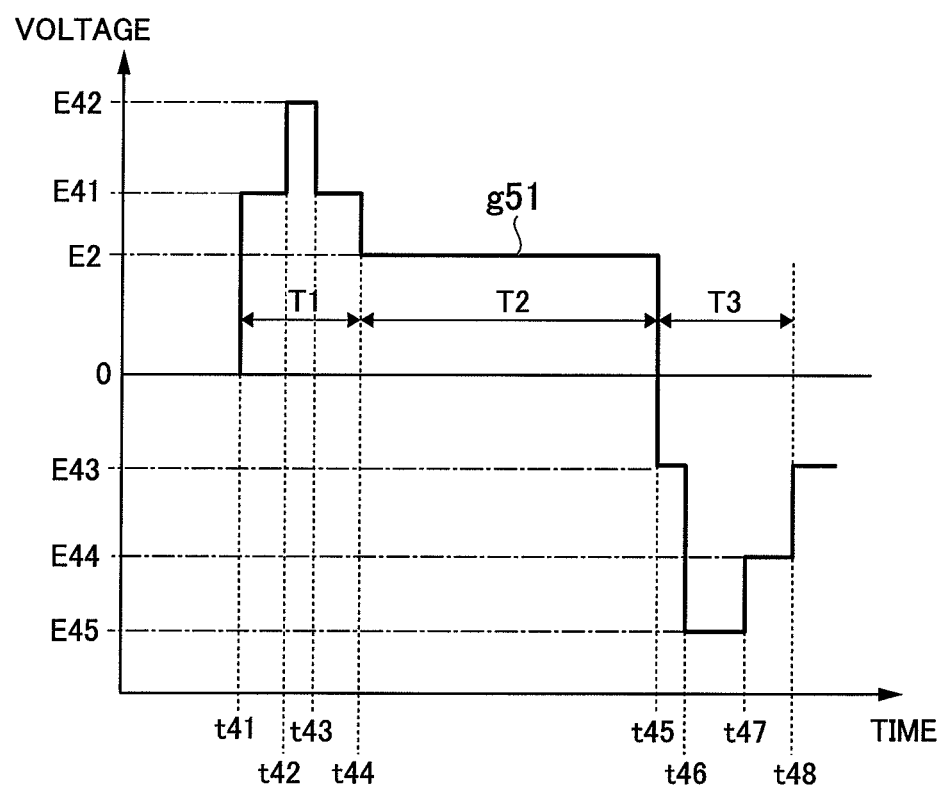
FIG. 8 is a diagram showing another example of the drive signal related to the embodiment.

FIG. 8 is a diagram showing another example of the drive signal related to the present embodiment. In FIG. 8, the horizontal axis represents time, and the vertical axis represents voltage. Further, the waveform g51 represents a temporal variation of the drive signal.

In FIG. 8, the period from the time t41 to the time t44 is the starting period (the first application time; T1). The period from the time t44 to the time t45 is the rotation period (the second application time; T2). The period from the time t45 to the time t48 is the stoppage period (the third application time; T3).

As represented by the waveform g51, the drive section 60 outputs the electrical power with the voltage value of E41 during the period from the time t41 to the time t42. Here, the voltage value E41 (a first voltage value) is smaller than the positive power supply voltage value supplied to the drive section 60.

Subsequently, the drive section 60 outputs the electrical power with the voltage value of E42 during the period from the time t42 to the time t43. Here, the voltage value E42 (a second voltage value) is the positive power supply voltage value supplied to the drive section 60, and is larger than the voltage value E41.

Subsequently, the drive section 60 outputs the electrical power with the voltage value of E41 during the period from the time t43 to the time t44.

Subsequently, during the period from the time t44 to the time t45, the drive section 60 outputs the electrical power with the voltage value of E2 (the steady operation period voltage value). It should be noted that the voltage value E2 is smaller than the voltage value E41 and the voltage value E42. Further, the period T1 is shorter than the period T2.

Subsequently, during the period from the time t45 to the time t46, the drive section 60 outputs the electrical power with the voltage value of E43. Here, the voltage value E43 (a third voltage value) is smaller than the power supply voltage value supplied to the drive section 60.

Subsequently, the drive section 60 outputs the electrical power with the voltage value of E45 (a fourth voltage value) during the period from the time t46 to the time t47. Here, the voltage value E45 is the negative power supply voltage value supplied to the drive section 60. The absolute value of the voltage value E45 is larger than the absolute value of the voltage value E43.

Subsequently, the drive section 60 outputs the electrical power with the voltage value of E44 (a fifth voltage value) during the period from the time t47 to the time t48. Here, the absolute value of the voltage value E44 is larger than the absolute value of the voltage value E43, and is smaller than the absolute value of the voltage value E45.

Subsequently, the drive section 60 changes the voltage value from E44 to E43 at the time t48.

In the example shown in FIG. 8, as described above, the initial voltage value E41 to be applied at the start-up is made higher than the voltage value E2 and lower than the power supply voltage value. Subsequently, the voltage value is changed from E41 to E42, and is then decreased from E42 to E41, and further to E2 in a stepwise manner.

Further, in the example shown in FIG. 8, the initial voltage value E43 to be applied at the stoppage (the braking period) is made lower than the power supply voltage value. Further, in the example shown in FIG. 8, the voltage value is changed from E43 to E45, and is then gradually decreased from E45 toward 0 V also in the stoppage period.

Further, in the example shown in FIG. 8, the voltage value E41 to be applied first at the start-up is lower than the maximum voltage value E42. Further, the voltage value E41 to be applied first at the start-up is equal to or higher than the voltage value E2 as the steady operation period voltage value. Further, the initial voltage value E43 of the reverse direction voltage in the stoppage period is lower than the reverse direction maximum voltage value E45.

According to the example shown in FIG. 8, by controlling the drive signal in such a manner, it is possible to prevent the excessive current to the motor during the start-up period and the stoppage period. Thus, it is possible to reduce the damage to a coil provided to the motor, the circuit for controlling the motor, and the battery as the power supply, and further achieve reduction in power consumption. Further, it is also possible to reduce the noise generated by the motor in the start-up period and the stoppage period.

Further, according to the example shown in FIG. 8, by gradually increasing the voltage value at the start-up, and then gradually decreasing the voltage value, it is possible to reach the predetermined rotation frequency (e.g., N1 (FIG. 5)) while decreasing the overshoot in the rotation frequency at the start-up.

Further, according to the example shown in FIG. 8, since it is arranged that the voltage value is gradually decreased toward 0 V in the stoppage period, there is no chance that the motor rotates in the normal rotational direction once again due to the brake signal, and the rotation of the motor can reliably be stopped.

It should be noted that although there is described the example in which the voltage values E42, E45 are the power supply voltage values in the example shown in FIG. 8, this is not a limitation. The voltage values E42, E45 can also be larger than the power supply voltage values.

Further, although there is described the example in which the drive signal is controlled to gradually increase and then gradually decrease in both of the start-up period and the stoppage period in the example shown in FIG. 8, it is also possible to control the drive signal to gradually increase and then gradually decrease in at least one of the start-up period and the stoppage period.

Further, although the description is presented based on the drive signal shown in FIG. 3 in the example shown in FIG. 8, this is not a limitation, and it is also possible to arrange that the drive signal is controlled to gradually increase and then gradually decrease in at least one of the start-up period and the stoppage period as described with reference to FIG. 8 also in FIG. 6 and FIG. 7.

Further, it is also possible to arrange that an idle period is provided in the PWM control described using FIG. 5, and in the idle period, the drive signal is controlled to gradually increase and then gradually decrease.

As described above, according to the present embodiment, it is possible to increase the start-up torque of the vibration generation device to shorten the time until the rotation frequency in the steady operation of the vibration generation device is reached. Further, according to the present embodiment, it becomes possible to rapidly stop the vibration generation device, and it is possible to propagate the lively vibration to the user.

Then, a configuration example of the vibration motor will be described.

Figure 9:
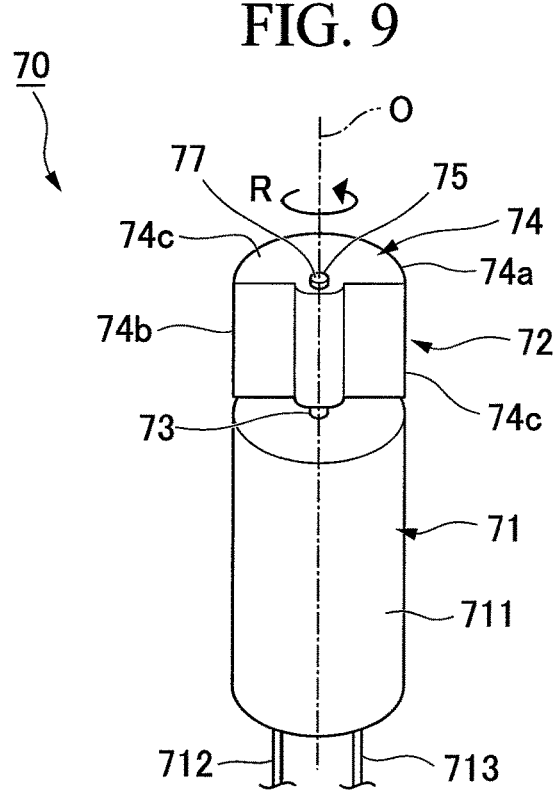
FIG. 9 is a perspective view of a first vibration motor according to the embodiment, and is an explanatory diagram showing a state before attaching an air resistance reduction part.

FIG. 9 is a perspective view of a first vibration motor according to the present embodiment, and is an explanatory diagram showing a state before attaching an air resistance reduction part.

As described above, the vibration motor 70 according to the present embodiment shown in FIG. 9 is used while being incorporated in an electronic apparatus such as information equipment such as a cellular phone or a tablet PC.

The vibration motor 70 is, for example, a brushed DC motor having a cylindrical shape, and is provided with a stator 71, and a rotor 72 rotatably provided to the stator 71.

The stator 71 has a stator housing 711 having a cylindrical shape. Inside the stator housing 711, there are disposed a magnet not shown, a commutator, and brushes. From the stator 71, there extend a pair of lead wires 712, 713 for positive and negative terminals for supplying the electrical power.

The rotor 72 has a coil not shown, a coil holder not shown the coil is wound around, a shaft 73 attached to the coil holder, and a weight 74. The coil and the coil holder are disposed inside the stator housing 711.

One end of the shaft 73 is disposed inside the stator housing 711, and the other end thereof projects outside the stator housing 711. To the one end of the shaft 73, there is fixed the coil holder.

To the other end of the shaft 73, there is fixed the weight T4. The weight 74 is formed to have a semicircular shape viewed from the axial direction of the rotor 72, and has the gravity center located eccentrically in the radial direction with respect to the central axis O of the shaft 73.

At the position corresponding to the central axis O in the weight 74, there is disposed a locking part 75 projecting in the axial direction. The locking part 75 is fitted in a fitting hole 77 of an air resistance reduction part 76 (FIG. 10) described later to be locked.

The vibration motor 70 is capable of generating a vibration due to the excitation force caused by the imbalance of the gravity center of the weight 74 when the rotor 72 rotates.

In the case of operating the vibration motor 70 configured as described above, a current is supplied to the coil through the lead wires 712, 713 and the brushes. Then, due to the mutual action between the magnetic force generated in the coil and the magnetic force of the magnet, the coil, the coil holder and the shaft 73 rotate together in the direction of the arrow R (the counterclockwise direction viewed from the weight 74 side in the axial direction) around the central axis O. As a result, it is possible to generate the vibration by rotating the weight 74 around the central axis O.

Figure 10:
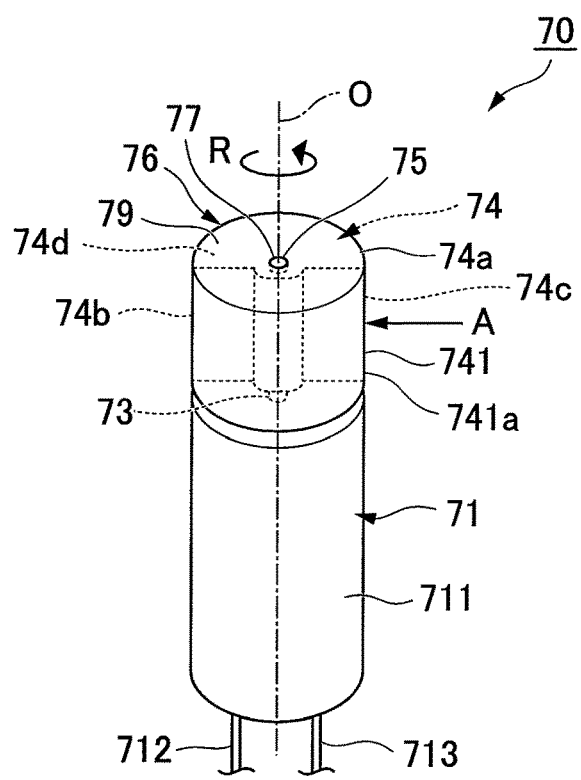
FIG. 10 is a perspective view of the first vibration motor according to the embodiment, and is an explanatory diagram showing a state when the air resistance reduction part is attached.
Figure 11:
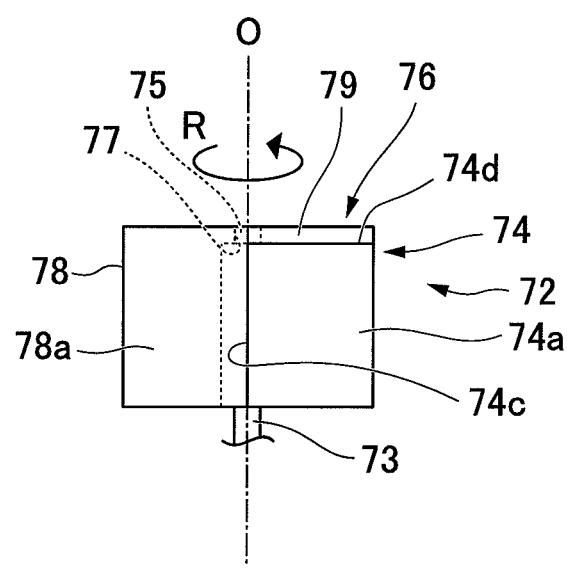
FIG. 11 is a diagram viewed along the arrow A shown in FIG. 10.

FIG. 10 is a perspective view of the first vibration motor 70 according to the present embodiment, and is an explanatory diagram showing a state when the air resistance reduction part is attached. FIG. 11 is a diagram viewed along the arrow A shown in FIG. 10.

Here, as shown in FIG. 10 and FIG. 11, the vibration motor 70 according to the present embodiment is provided with the air resistance reduction part 76. The air resistance reduction part 76 is provided to the weight 74, and reduces the air resistance to the weight 74 when the rotor 72 rotates.

The air resistance reduction part 76 is formed of, for example, a resin material, and has an arcuate part 78 and a covering part 79.

The arcuate part 78 connects an end edge 74b on the upstream side in the rotational direction (the direction of the arrow R) of the rotor 72 in the outer circumferential surface 74a of the weight 74 formed to have the semicircular shape and an end edge 74c on the downstream side in the rotational direction (the direction of the arrow R) to each other so as to, form a circular arc shape. The curvature radius of the outer circumferential surface 78a of the arcuate part 78 is made roughly the same as the curvature radius of the outer circumferential surface 74a of the weight 74. The arcuate part 78 is disposed in the state of having contact with the end edge 74b on the upstream side and the end edge 74c on the downstream side. Thus, since the outer circumferential surface 74a of the weight 74 and the arcuate part 78 are continuously connected to each other, the air can smoothly flow along the outer circumferential surface 74a of the weight 74 and the outer circumferential surface 78a of the arcuate part 78 due to the rotation of the rotor 72.

The covering part 79 has a disk-like shape, and is formed integrally with the arcuate part 78. At the center of the covering part 79, there is formed the fitting hole 77. The locking part 75 of the weight 74 is pressed into the fitting hole 77. Thus, the air resistance reduction part 76 is fixed to the weight 74 in the state in which the covering part 79 covers the outer end surface 74d of the weight 74 from the outside in the axial direction in the rotor 72.

Incidentally, although the structure in which the locking part 75 is pressed into the fitting hole 77 is shown hereinabove, it is also possible to fit the locking part 75 into the fitting hole 77, and then fix the covering part 79 and the weight 74 to each other with bonding, welding, or the like.

According to this configuration, since the weight 74 is provided with the air resistance reduction part 76 for reducing the air resistance to the weight 74 when the rotor 72 rotates, it is possible to reduce the air resistance when the rotor 72 starts rotating to thereby achieve the prompt start-up.

Therefore, it is possible to realize the vibration motor 70 superior in responsivity compared to the related art.

Further, since it is possible to reduce the air resistance to the weight 74 when the rotor 72 rotates, the power consumption can be reduced compared to the related art. Further, since it is possible to reduce the air resistance to the weight 74 when the rotor 72 rotates to thereby suppress the wind noise, it is possible to realize the vibration motor 70 superior in quietness compared to the related art.

Further, since the air resistance reduction part 76 connects the outer circumferential surface 74a of the weight 74 so as to form the circular arc shape, it is possible to reduce the air resistance in particular along the outer circumferential surface 74a of the weight 74. Therefore, it is possible to realize the vibration motor 70 superior in responsivity compared to the related art.

Further, since the air resistance reduction part 76 is provided with the covering part 79 for covering the weight 74 from the outside in the axial direction in the rotor 72, it is possible to achieve reduction of the air resistance along the outer end surface 74d in the axial direction of the weight 74 in addition to the reduction of the air resistance along the outer circumferential surface 74a of the weight 74. Therefore, it is possible to realize the vibration motor 70 superior in responsivity compared to the related art.

Further, since the covering part 79 and the weight 74 are fixed to each other by pressing the locking part 75 into the fitting hole 77 of the covering part 79, it is possible to detachably attach the air resistance reduction part 76 to the weight 74 with ease and the simple configuration.

Further, since the electronic apparatus 1 is provided with the vibration motor 70 described above, it is possible to realize the electronic apparatus 1 superior in responsivity when transmitting the information to the user with the vibration compared to the related art. Further, it is possible to realize the electronic apparatus 1 capable of reducing the power consumption compared to the related art. Further, it is possible to realize the electronic apparatus 1 superior in quietness when transmitting the information to the user with the vibration compared to the related art.

Then, a second configuration example of the vibration motor according to the present embodiment will be described. The drive motor is not limited to the so-called cylindrical motor described using FIG. 9 through FIG. 11, but the invention can be applied to a variety of types of motors.

Figure 12:
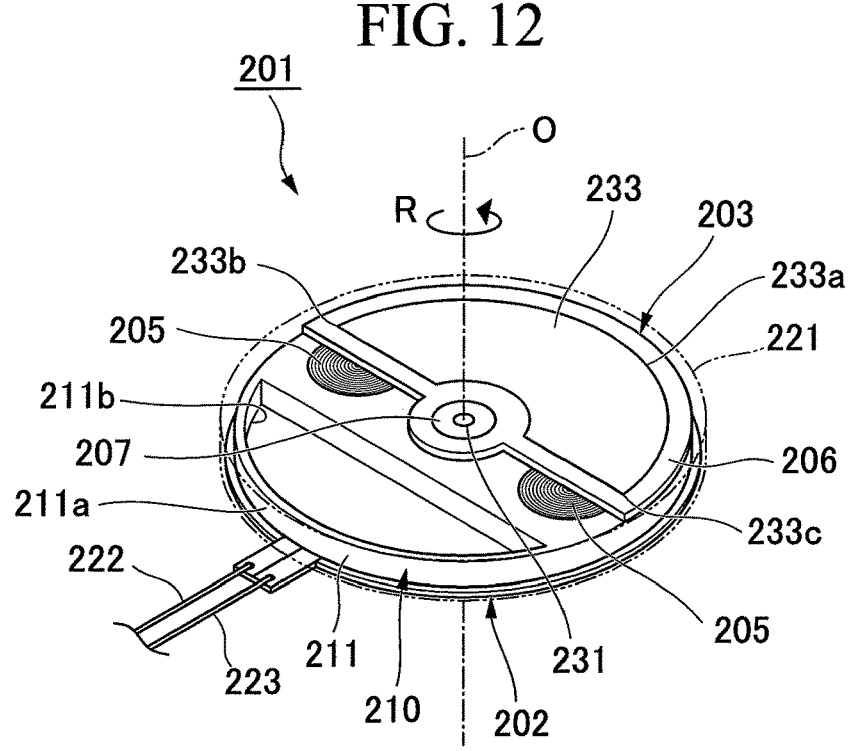
FIG. 12 is a perspective view of a second vibration motor according to the embodiment.

FIG. 12 is a perspective view of a second vibration motor according to the present embodiment.

As shown in FIG. 12, the vibration motor 201 is a so-called coin-type brushed DC motor, and is provided with a stator 202, and a rotor 203 rotatably provided to the stator 202.

The stator 202 is formed to have a disk-like shape, and is provided with a magnet not shown, a commutator, and brushes. From the stator 202, there extend a pair of lead wires 222, 223 for positive and negative terminals for supplying the electrical power. Further, from the stator 202, there is erected the shaft 231. A shaft 231 is inserted in a bearing 207 of the rotor 203. Thus, the rotor 203 is made rotatable around the central axis O.

The rotor 203 has a pair of coils 205, 205, a substrate not shown on which the pair of coils 205, 205 are wound, and a weight 233. The pair of coils 205, 205, the substrate, and the weight 233 are integrally fixed using a molded part 206 formed of, for example, a resin material.

The weight 233 is formed to have a semicircular shape viewed from the axial direction of the rotor 203, and has the gravity center located eccentrically in the radial direction with respect to the central axis O of the shaft 231.

The stator 202 and the rotor 203 configured as described above are covered by a housing 221. It should be noted that in FIG. 12, the housing 221 is shown with imaginary lines.

Figure 13:
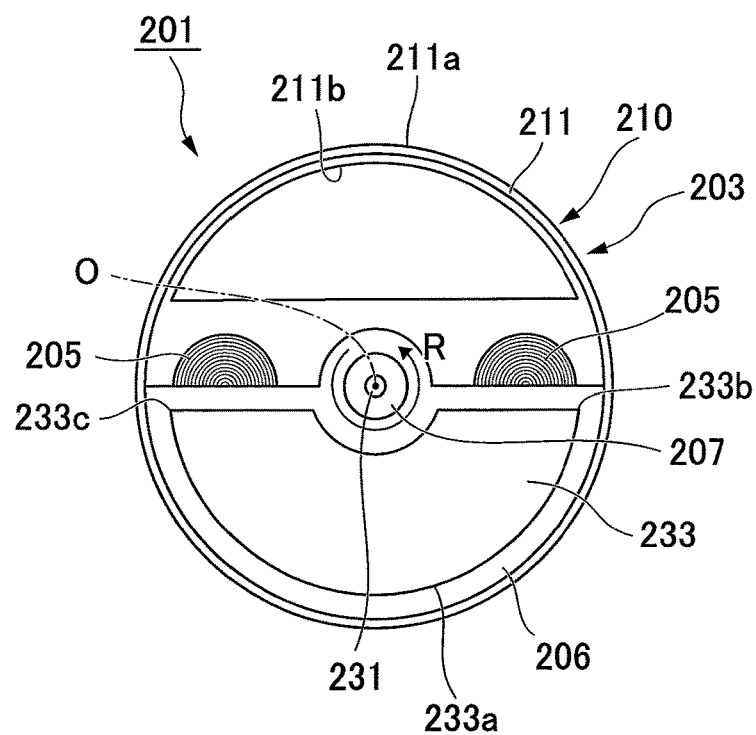
FIG. 13 is a plan view of a second air resistance reduction part of the embodiment.

FIG. 13 is a plan view of a second air resistance reduction part of the embodiment.

As shown in FIG. 13, the air resistance reduction part 210 is formed of, for example, a resin material, and has an arcuate part 211.

The arcuate part 211 connects an end edge 233b on the upstream side in the rotational direction (the direction of the arrow R) of the rotor 203 in the outer circumferential surface 233a of the weight 233 formed to have the semicircular shape and an end edge 233c on the downstream side in the rotational direction (the direction of the arrow R) to each other so as to form a circular arc shape. The arcuate part 211 is formed integrally with the molded part 206.

The region located on the inner side in the radial direction of the arcuate part 211, and between the arcuate part 211 and the molded part 206 forms a through hole 211b penetrating in the axial direction. Thus, it becomes possible to reduce the weight of the rotor 203, and therefore, the power consumption can be reduced. Further, the curvature radius of the outer circumferential surface 211a of the arcuate part 211 is made roughly the same as the curvature radius of the outer circumferential surface of the molded part 206. Thus, since the outer circumferential surface of the molded part 206 and the arcuate part 211 are continuously connected to each other, the air can smoothly flow along the outer circumferential surface of the molded part 206 and the outer circumferential surface 211a of the arcuate part 211 due to the rotation of the rotor 203.

It should be noted that the region located on the inner side in the radial direction of the arcuate part 211 and between the arcuate part 211 and the molded part 206 is not limited to the form of the through hole 211b, but can also be provided with a bottom part, or filled with, for example, a resin material.

According to the vibration motor 201 having the configuration shown in FIG. 12 and FIG. 13, even in the case of applying the invention to the coin-type brushed DC motor, substantially the same functions and advantages as those of the vibration motor 70 shown in FIG. 9 through FIG. 11 can be exerted. Specifically, since the weight 233 is provided with the air resistance reduction part 210 for reducing the air resistance to the weight 233 when the rotor 203 rotates, it is possible to reduce the air resistance when the rotor 203 starts rotating to thereby achieve the prompt start-up. Therefore, it is possible to realize the vibration motor 201 superior in responsivity compared to the related art.

Further, since it is possible to reduce the air resistance to the weight 233 when the rotor 203 rotates, the power consumption can be reduced compared to the related art. Further, since it is possible to reduce the air resistance to the weight 233 when the rotor 203 rotates to thereby suppress the wind noise, it is possible to realize the vibration motor 201 superior in quietness compared to the related art.

Figure 14:
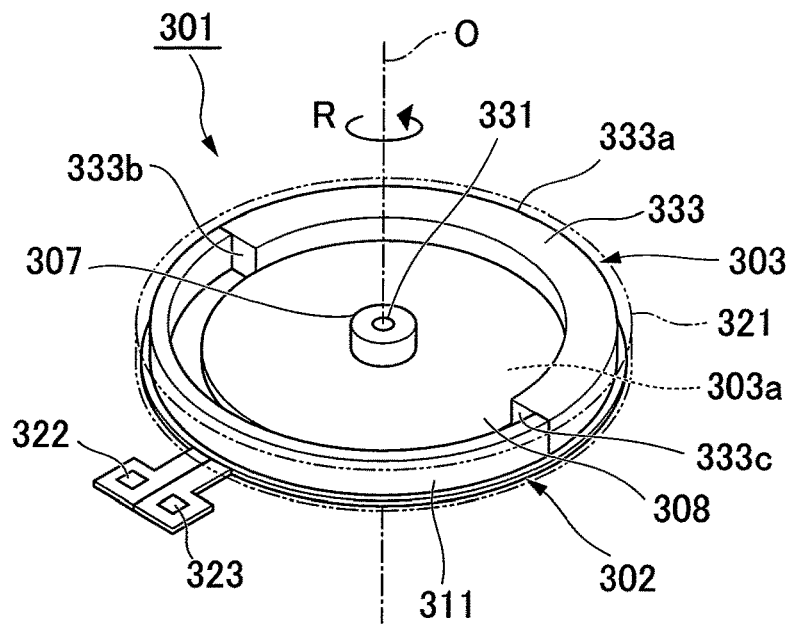
FIG. 14 is a perspective view of a third vibration motor according to the embodiment.

FIG. 14 is a perspective view of a third vibration motor according to the present embodiment.

As shown in FIG. 14, the vibration motor 301 is a so-called coin-type brushless DC motor, and is provided with a stator 302, and a rotor 303 rotatably provided to the stator 302.

The stator 302 is formed to have a disk-like shape, and is provided with a pair of coils not shown, and a position detection sensor not shown. From the stator 302, there extend a pair of terminal parts 322, 323 for supplying the electrical power. A shaft 331 is inserted in a bearing 307 of the rotor 303. Further, from the stator 302, there is erected the shaft 331. The position detection sensor is a magnetic sensor such as a Hall element, and detects the position of the rotor 303 described later.

Figure 15:
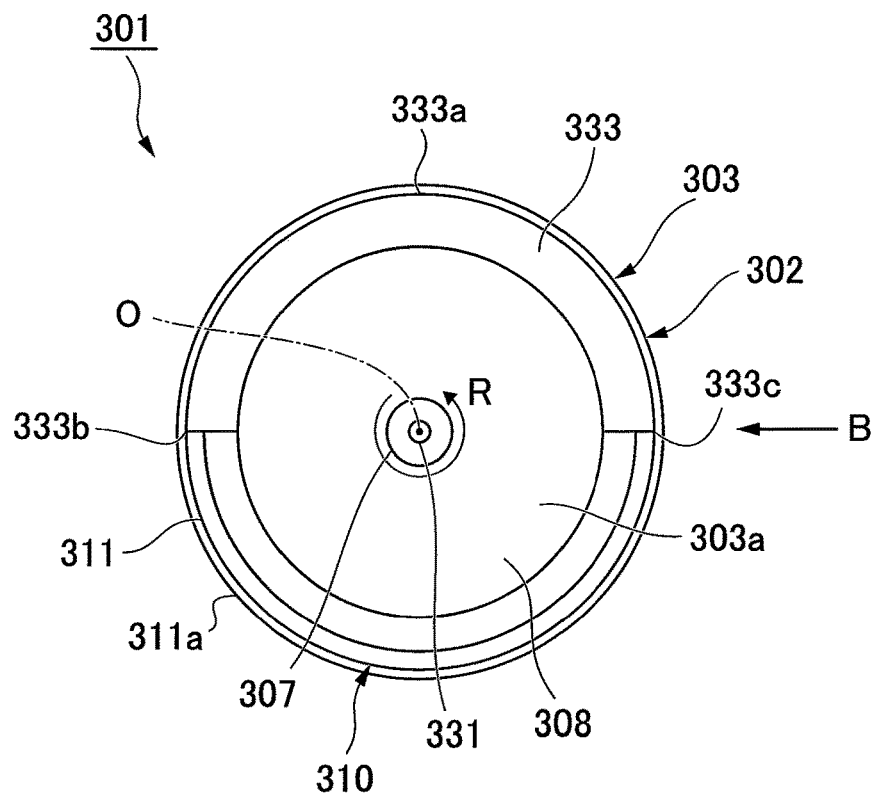
FIG. 15 is a plan view of a third air resistance reduction part related to the embodiment.

FIG. 15 is a plan view of a third air resistance reduction part related to the present embodiment.

The rotor 303 has a yoke 303a having a disk-like shape, a magnet 308 having a ring-like shape, and a weight 333. The yoke 303a and the magnet 308 are disposed so as to be stacked on one another in the axial direction. The weight 333 is formed to have a semicircular arc shape viewed from the axial direction of the rotor 303, and has the gravity center located eccentrically in the radial direction with respect to the central axis O of the shaft 331. The weight 333 is disposed on the outer side in the radial direction of the magnet 308, and is fixed to the yoke 303a with, for example, an adhesive or welding.

Figure 16:
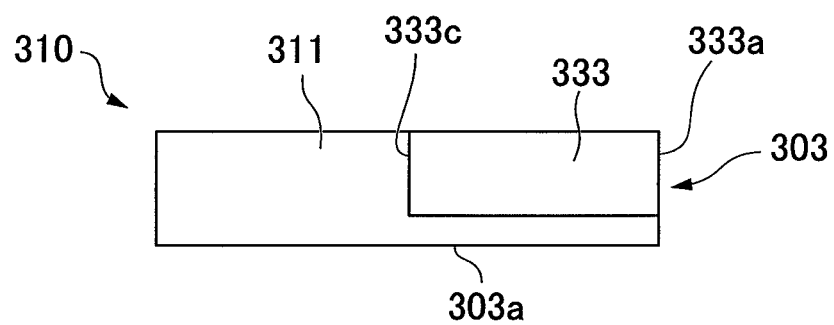
FIG. 16 is a diagram viewed along the arrow B shown in FIG. 15.

FIG. 16 is a diagram viewed along the arrow B shown in FIG. 15.

As shown in FIG. 15 and FIG. 16, the air resistance reduction part 310 is formed of, for example, a metal material, and has an arcuate part 311.

The arcuate part 311 connects an end edge 333b on the upstream side in the rotational direction (the direction of the arrow R) of the rotor 303 in the outer circumferential surface 333a of the weight 333 formed to have the semicircular arc shape and an end edge 333c on the downstream side in the rotational direction (the direction of the arrow R) to each other so as to form a circular arc shape. The arcuate part 311 and the yoke 303a are formed integrally with each other using press working such as drawing.

The stator 302 and the rotor 303 configured as described above are covered by a housing 321. It should be noted that in FIG. 14, the housing 321 is illustrated with imaginary lines.

Then, a modified example of the third air resistance reduction part will be described.

Figure 17:
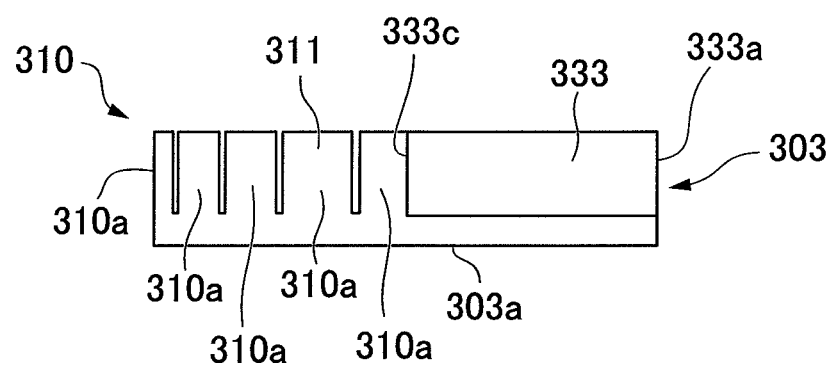
FIG. 17 is a side view of a modified example of the third air resistance reduction part related to the embodiment.

FIG. 17 is a side view of the modified example of the third air resistance reduction part related to the present embodiment.

It should be noted that the shape of the air resistance reduction part 310 is not limited to the form described above. For example, as shown in FIG. 17, the air resistance reduction part 310 can be formed by providing cutouts to an edge part of a plate member, which is formed to have a semicircular shape, to thereby form a plurality of extending pieces 310a, and then bending the extending pieces 310a toward the axial direction to erect the extending pieces 310a.

According to the vibration motor 301, there can be exerted substantially the same functions and advantages as those of the vibration motor 70 and the vibration motor 201 described above. Specifically, since the weight 333 is provided with the air resistance reduction part 310 for reducing the air resistance to the weight 333 when the rotor 303 rotates, it is possible to reduce the air resistance when the rotor 303 starts rotating to thereby achieve the prompt start-up. Therefore, it is possible to realize the vibration motor 301 superior in responsivity compared to the related art.

Further, since it is possible to reduce the air resistance to the weight 333 when the rotor 303 rotates, the power consumption can be reduced compared to the related art. Further, since it is possible to reduce the air resistance to the weight 333 when the rotor 303 rotates to thereby suppress the wind noise, it is possible to realize the vibration motor 301 superior in quietness compared to the related art.

Then, a fourth air resistance reduction part will be described.

Figure 18:
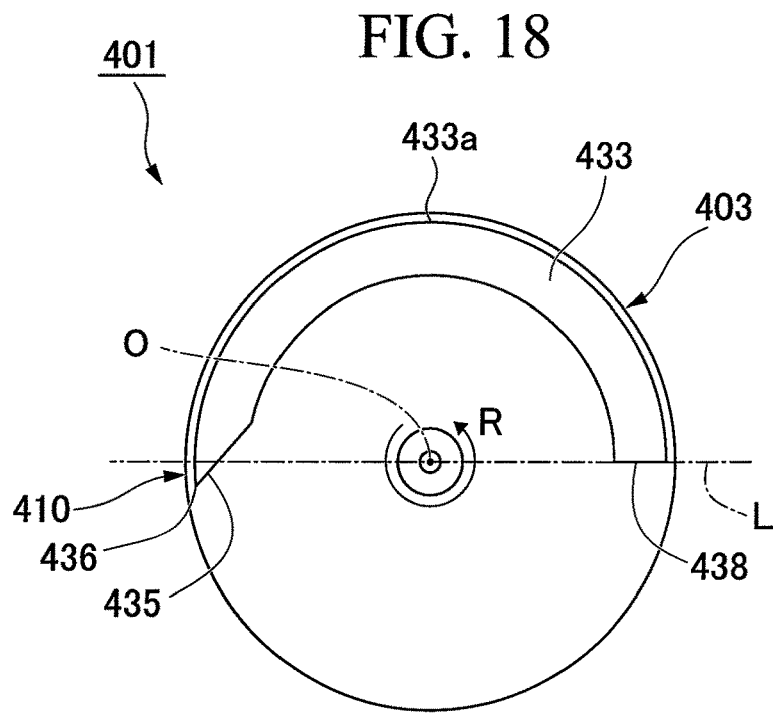
FIG. 18 is a plan view of a fourth air resistance reduction part related to the embodiment.

FIG. 18 is a plan view of the fourth air resistance reduction part related to the present embodiment.

The air resistance reduction part 310 of the vibration motor 301 described above is provided with the arcuate part 311 (see FIG. 15). In contrast, as shown in FIG. 18, the fourth air resistance reduction part 410 is different from the vibration motor 301 in the point that the air resistance reduction part 410 is formed of a tilted surface 435 provided to an end surface of the weight 433. It should be noted that regarding parts having substantially the same configuration as that of the vibration motor 301, the detailed description will hereinafter be omitted.

As shown in FIG. 18, the weight 433 is formed to have a circular arc shape along the outer circumferential surface of the rotor 403 viewed from the axial direction of the rotor 403.

The end surface on the downstream side in the rotational direction (the direction of the arrow R) of the rotor 403 of the weight 433 forms the tilted surface 435 tilted from the upstream side toward the downstream side in the rotational direction, and from the inner side toward the outer side in the radial direction of the rotor 403.

Here, viewed from the axial direction, defining a straight line passing along the radial direction through the central axis O as an imaginary line L, the tilted surface 435 is disposed so as to cross the imaginary line L. Further, a tip 436 on the downstream side in the rotational direction of the weight 433 is located on the downstream side in the rotational direction of the imaginary line L passing along the radial direction through the central axis O viewed from the axial direction.

Further, the end surface 438 on the upstream side in the rotational direction of the weight 433 forms a plane along the imaginary line L.

Figure 19:
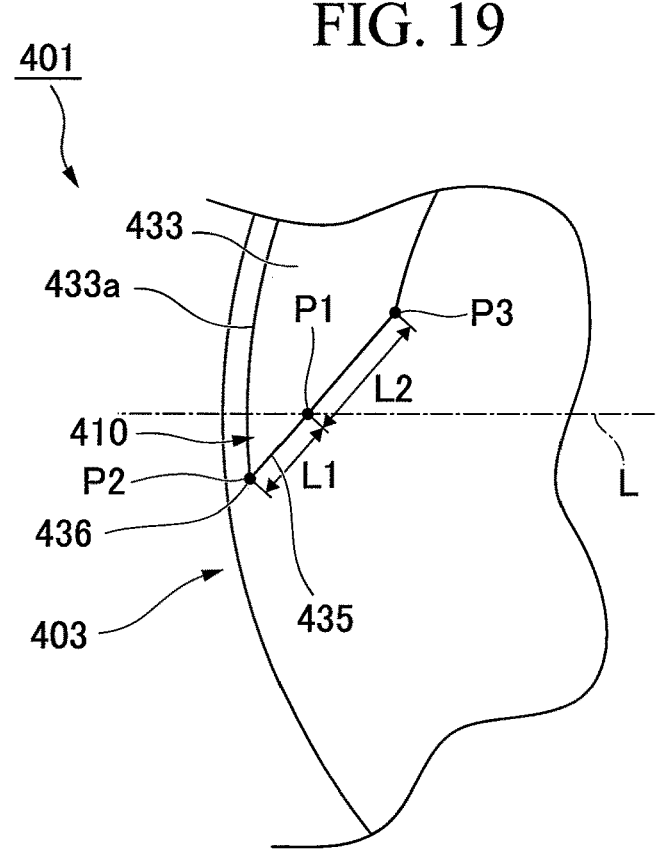
FIG. 19 is an enlarged view of the fourth air resistance reduction part related to the embodiment.

FIG. 19 is an enlarged view of the fourth air resistance reduction part related to the present embodiment.

As shown in FIG. 19, defining the distance from an intersection point P1 between the tilted surface 435 and the imaginary line L to the outer side edge part P2 in the radial direction of the tilted surface 435 as L1, and the distance from the intersection point P1 between the tilted surface 435 and the imaginary line L to the inner side edge part P3 in the radial direction of the tilted surface 435 as L2, the fourth air resistance reduction part 410 is formed to fulfill the following formula (1).

$$L1 < L2 \tag{1}$$

According to the vibration motor 401 provided with the fourth air resistance reduction part, the air can flow smoothly along the outer circumferential surface 433a of the weight 433 and the tilted surface 435 due to the rotation of the rotor 403. Therefore, it is possible to realize the vibration motor 401 superior in responsivity compared to the related art. Further, it is possible to realize the vibration motor 401 capable of reducing the power consumption and superior in quietness compared to the related art.

Further, since the tip 436 on the downstream side of the weight 433 is located on the downstream side of the imaginary line L along the radial direction, it is possible to exert centrifugal force equivalent to that of the weight not provided with the tilted surface at the tip thereof. Therefore, it is possible to realize the vibration motor 401 capable of providing a desired vibration.

Further, since the end surface 438 on the upstream side of the weight 433 forms the plane along the imaginary line L, it is possible to provide the air resistance to easily stop the rotor 403 when the rotor 403 makes reverse rotation. Therefore, it is possible to realize the vibration motor 401 provided with a variety of functions such as quick start in the normal rotation, and quick stop in the reverse rotation.

Further, since the tilted surface 435 at the tip 436 on the downstream side of the weight 433 is disposed so as to cross the imaginary line L, it is possible to exert centrifugal force equivalent to that of the weight not provided with the tilted surface at the tip thereof. Therefore, it is possible to realize the vibration motor 401 capable of providing a desired vibration.

Further, since the fourth air resistance reduction part 410 is formed so as to fulfill the formula (1), the tilted surface 435 is formed considering the balance between the centrifugal force acting on the inner side in the radial direction of the intersection point P1 between the tilted surface 435 and the imaginary line L, and the centrifugal force acting on the outer side in the radial direction of the intersection point P1 between the tilted surface 435 and the imaginary line L. Therefore, it is possible to realize the vibration motor 401 capable of providing a desired vibration.

It should be noted that in the vibration motor 401, the end surface on the downstream side in the rotational direction (the direction of the arrow R) of the rotor 403 of the weight 433 forms the tilted surface 435 tilted from the upstream side toward the downstream side in the rotational direction, and from the inner side toward the outer side in the radial direction of the rotor 403. In contrast, it is also possible for the end part on the downstream side of the weight 433 to have a peaked shape viewed from the axial direction by further providing a tilted surface, which is tilted from the upstream side toward the downstream side in the rotational direction, and from the outer side toward the inner side in the radial direction of the rotor 403, to the outer side in the radial direction in the end surface on the downstream side in the rotational direction (the direction of the arrow R) of the rotor 403 of the weight in addition to the tilted surface 435.

Further, the tilted surface 435 of the weight 433 is disposed so as to cross the imaginary line L viewed from the axial direction in the vibration motor 401, but is not required to cross the imaginary line L.

Further, the tip 436 on the downstream side in the rotational direction of the weight 433 is located on the downstream side in the rotational direction of the imaginary line L viewed from the axial direction, but can also be located on the upstream side in the rotational direction of the imaginary line L.

The manufacturing methods, the materials, and so on of the air resistance reduction parts 76, 210, 310, and 410 in the respective vibration motors 70, 201, 301, and 401 are not limited to the respective embodiments. Therefore, for example, the air resistance reduction part 76 can also be formed of a metal material.

Modified Examples

Then, modified examples of the control device of the vibration generation device will be described.

Figure 20:
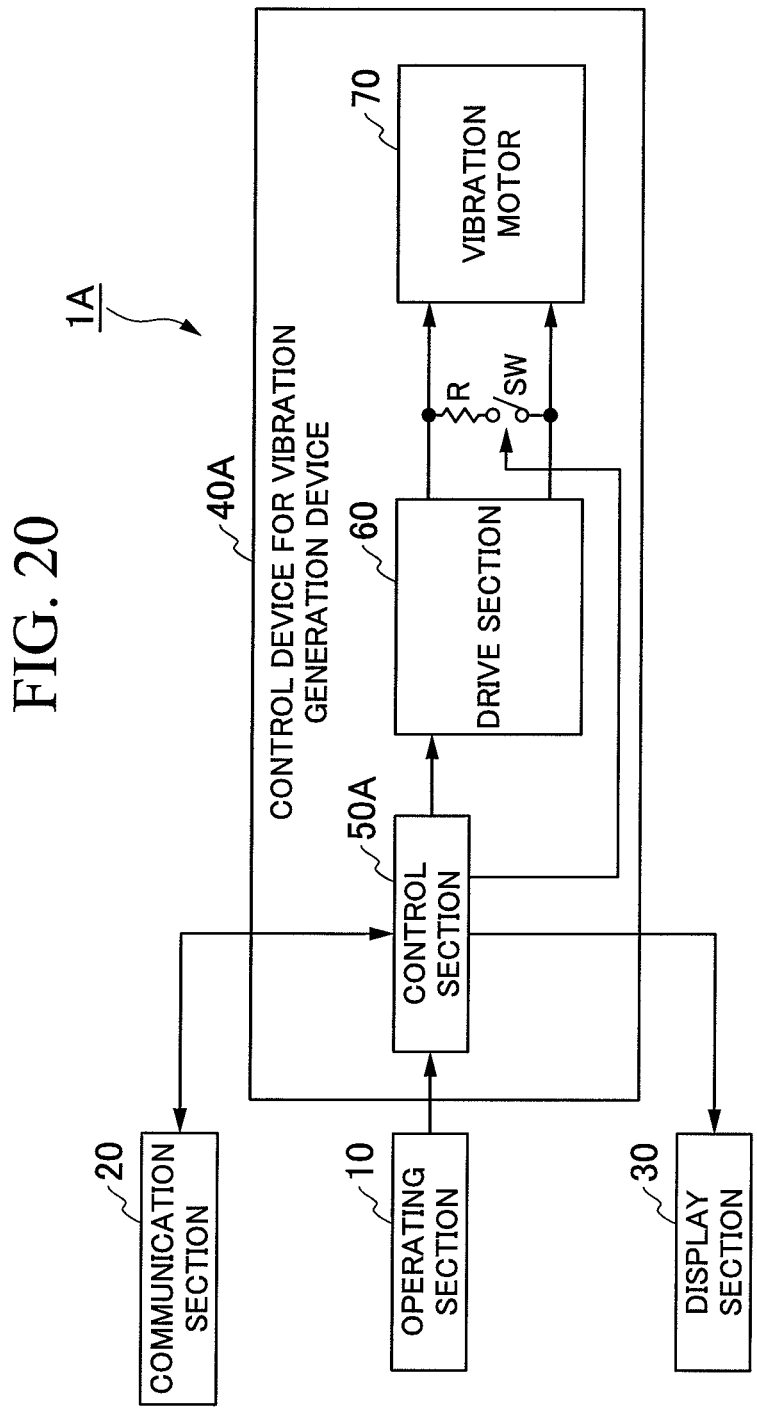
FIG. 20 is a block diagram showing a configuration example of an electronic apparatus including a control device for a vibration generation device according to a modified example of the embodiment.

FIG. 20 is a block diagram showing a configuration example of an electronic apparatus 1A including a control device 40A for a vibration generation device according to a modified example of the present embodiment. As shown in FIG. 20, the electronic apparatus 1A is provided with the operating section 10, the communication section 20, the display section 30, and a control device 40A for the vibration generation device. The control device 40A for the vibration generation device is provided with a control section 50A (the control section), the drive section 60 (the drive section), the vibration motor 70 (the vibration generation device), a resistor R, and a switch SW. It should be noted that the functional sections having the same functions as in the control device 40 for the vibration generation device are denoted by the same reference symbols, and the description thereof will be omitted.

The control device 40A for the vibration generation device drives the vibration motor 70 in accordance with the operation result output by the operating section 10, the reception signal received by the communication section 20, and so on. The control device 40A for the vibration generation device generates the image signal in accordance with the operation result output by the operating section 10, and then outputs the image signal thus generated to the display section 30. The control device 40A for the vibration generation device generates the transmission signal based on the information to be transmitted, and then outputs the transmission signal thus generated to the communication section 20. Further, the control device 40A for the vibration generation device performs the control of setting the switch SW to an ON state for a predetermined time period so as to short the input terminals of the vibration motor 70 via the resistor R when the steady operation of the vibration motor 70 has been terminated.

The control section 50A outputs the drive instruction for driving the vibration motor 70 to the drive section 60 in accordance with the operation result output by the operating section 10. The control section 50A outputs the instruction for driving the vibration motor 70 to the drive section 60 in accordance with the reception signal received by the communication section 20 and so on. The control section 50A generates the image signal in accordance with the operation result output by the operating section 10, and then outputs the image signal thus generated to the display section 30. The control section 50A generates the transmission signal in accordance with, for example, the operation result output by the operating section 10, and then outputs the transmission signal thus generated to the communication section 20. Further, the control section 50A performs the control of setting the switch SW to the ON state for the predetermined time period so as to short the input terminals of the vibration motor 70 via the resistor R when the steady operation of the vibration motor 70 has been terminated.

The control section 60 generates the drive signal in accordance with the drive instruction output by the control section 50A, and then supplies the drive signal thus generated to the vibration motor 70. It should be noted that the drive section 60 has the step-up circuit, and is capable of generating the drive signal higher than the power supply voltage supplied. It should be noted that the drive signal will be described later. A first output terminal of the drive section 60 is connected to a first input terminal of the vibration motor 70 and one end of the resistor R, and a second output terminal of the drive section 60 is connected to a second input terminal of the vibration motor 70 and one end of the switch SW.

The one end of the resistor R is connected to the first output terminal of the drive section 60 and the first input terminal of the vibration motor 70, and the other end of the resistor R is connected to the other end of the switch SW.

The one end of the switch SW is connected to the second output terminal of the drive section 60 and the second input terminal of the vibration motor 70. The switch SW is switched between the ON state and the OFF state in accordance with the control of the control section 50A. When the switch SW is in the ON state, the both ends of the vibration motor 70 are shorted via the resistor R.

It should be noted that although the example in which the switch SW is connected to the both ends of the vibration motor 70 via the resistor R is illustrated in the example shown in FIG. 20, it is also possible to directly connect the switch SW to the both ends of the vibration motor 70.

Then, an example of the drive signal, the rotation frequency of the vibration motor 70, and the state of the switch SW in the present embodiment will be described.

Figure 21:
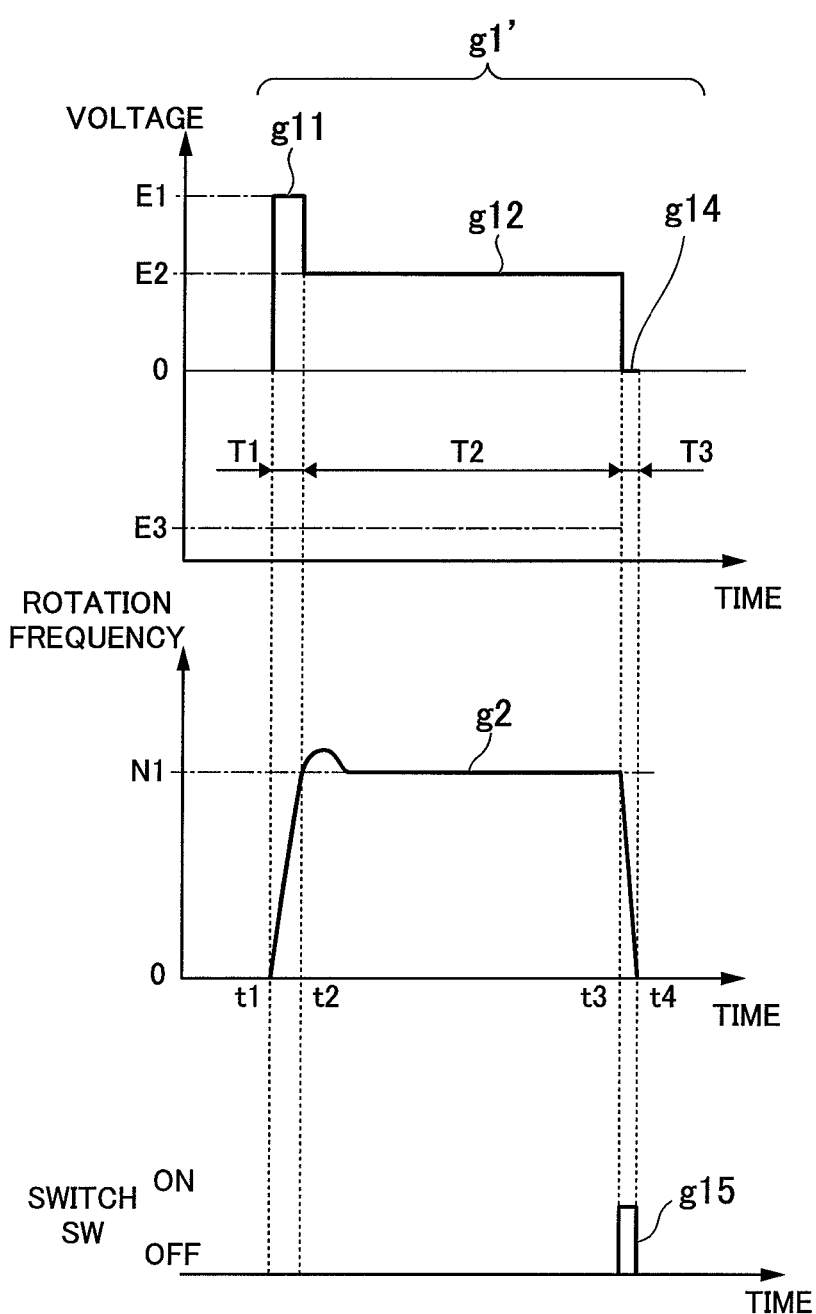
FIG. 21 is a diagram showing an example of a drive signal, the rotation frequency of the vibration motor, and the state of a switch related to a first modified example of the embodiment.

FIG. 21 is a diagram showing an example of the drive signal, the rotation frequency of the vibration motor 70, and the state of the switch SW related to a first modified example of the present embodiment. In FIG. 21, the horizontal axis represents time, and the vertical axes represent voltage and rotation frequency, respectively. The waveform g1' represents a temporal variation of the drive signal. The waveform g2 represents a temporal variation of the rotation frequency of the vibration motor 70. The waveform g15 represents the state of the switch SW. Further, the drive signal is configured including the waveform g11 as a start-up signal, the waveform g12 as a rotary drive signal, and the waveform g14 as the brake signal (the reverse rotation signal).

It should be noted that the waveform g11 and the waveform g12 are substantially the same as in FIG. 3.

As represented by the waveform g1, the drive section 60 outputs the electrical power with the voltage value of E1 (start-up period maximum voltage value) during the period (T1) from the time t1 to the time t2. Here, the voltage value E1 is higher than the power supply voltage value supplied to the drive section 60.

Subsequently, the drive section 60 outputs the electrical power with the voltage value of E2 (the steady operation period voltage value) during the period (T2) from the time t2 to the time t3. It should be noted that the voltage value E2 is smaller than the voltage value E1. Further, the period from the time t1 to the time t2 is shorter than the period from the time t2 to the time t3.

Subsequently, the control section 50A sets the switch SW to the ON state to thereby short the both ends of the vibration motor 70 via the resistor R during the period (T3) from the time t3 to the time t4. Thus, the voltage value turns to 0 V. The period T3 corresponds to the predetermined time. During the period (T3) from the time t3 to the time t4, the voltage value applied to the vibration motor 70 is 0 V as represented by the waveform g14, and the switch SW is in the ON state as represented by the waveform g15.

It should be noted that the period from the time t1 to the time t2 is the period (the first application time) of start-up, and the drive signal during this period is also the start-up signal (the waveform g11). The period from the time t2 to the time t3 is the rotation period (the second application time), and the drive signal during this period is also the rotary drive signal (the waveform g12). The period from the time t3 to the time t4 is the stoppage period (the third application time), and is also a short-circuit period of the vibration motor 70. The drive signal in this period is also the brake signal (the waveform g14). It should be noted that the first application time is shorter than the second application time. Further, the third application time is shorter than the second application time.

Further, similarly to FIG. 3, the rotation frequency of the vibration motor 70 increases from 0 to N1 in the period from the time t1 to the time t2 as represented by the waveform g2. After the time t2, the rotation frequency exceeds N1 once, and then becomes N1. Then, during the period to the time t3, the rotation frequency of the vibration motor 70 is kept at N1. In the period from the time t3 to the time t4, the rotation frequency of the vibration motor 70 decreases from N1 to 0. It should be noted that the rotation frequency N1 is, for example, about 9000 rpm.

It should be noted that although the example of the drive signal, the rotation frequency of the vibration motor 70, and the state of the switch SW in the modified example is described based on the drive voltage shown in FIG. 3, this is not a limitation. In FIG. 5, it is also possible to arrange that the control section 50A shorts the both ends of the drive motor 70 via the resistor R instead of applying the voltage value –E11 in the reverse direction. Alternatively, in FIG. 6, it is also possible to arrange that the control section 50A shorts the both ends of the drive motor 70 via the resistor R instead of applying the voltage value E23 in the reverse direction during the period from the time t23 to the time t24. Alternatively, in FIG. 7, it is also possible to arrange that the control section 50A shorts the both ends of the drive motor 70 via the resistor R instead of applying the voltage value E33 in the reverse direction during the period from the time t33 to the time t34. Alternatively, in FIG. 8, it is also possible to arrange that the control section 50A shorts the both ends of the drive motor 70 via the resistor R instead of applying the voltage values E43 through E45 in the reverse direction during the period from the time t45 to the time t48. It should be noted that in FIG. 5, FIG. 6, FIG. 7, and FIG. 8, the control section 50A sets the switch SW to the ON state to thereby short the both ends of the vibration motor 70 via the resistor R.

As described hereinabove, in the modified example, it is arranged that the both ends of the vibration motor 70 are shorted via the resistor R when the steady operation has been terminated.

Thus, according to the modified example, it is possible to instantaneously stop the rotation of the vibration motor 70.

Figure 22:
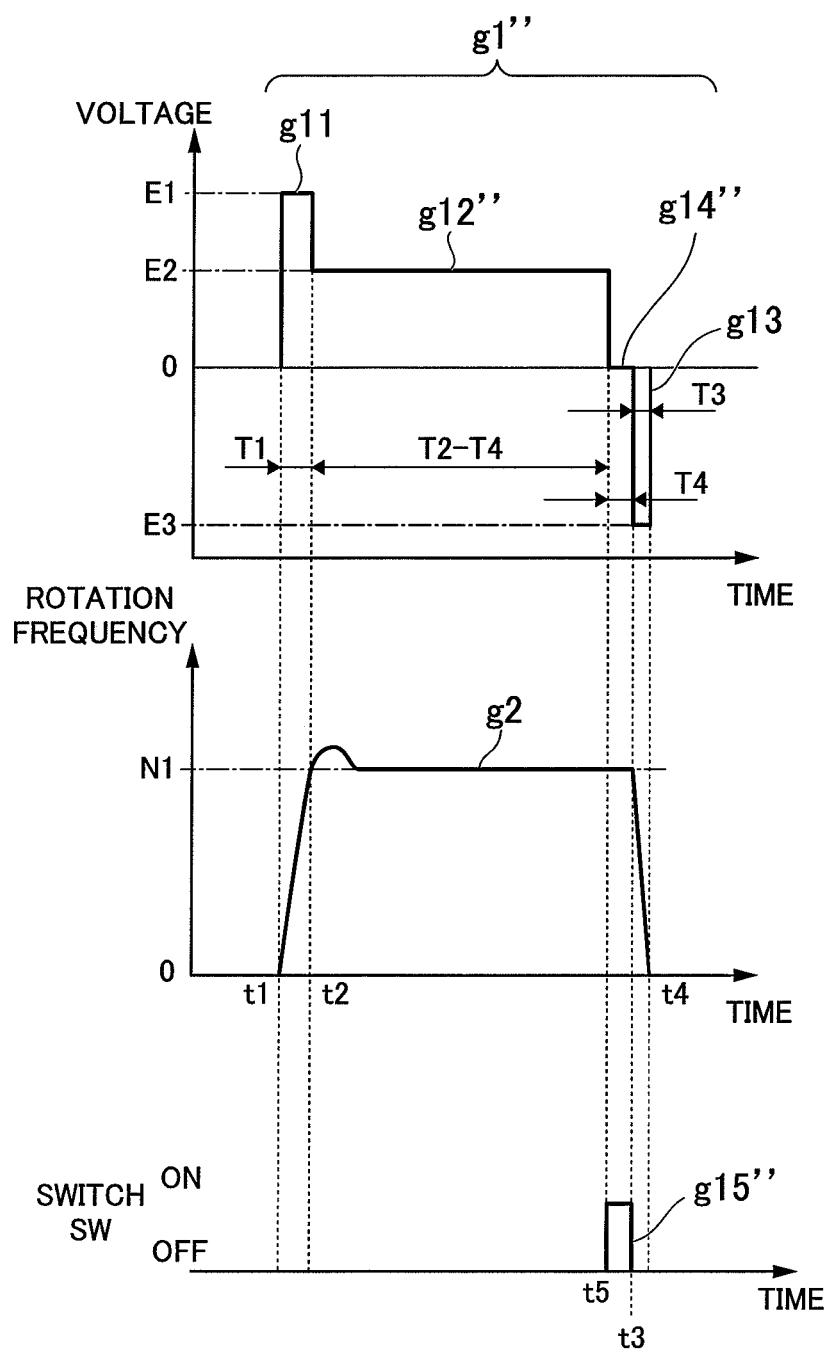
FIG. 22 is a diagram showing an example of a drive signal, the rotation frequency of the vibration motor, and the state of a switch related to a second modified example of the embodiment.

It should be noted that it is also possible for the control section 50A to short the both ends of the vibration motor 70 via the resistor R for a specific time period before the reverse rotation operation as shown in FIG. 22. FIG. 22 is a diagram showing an example of the drive signal, the rotation frequency of the vibration motor 70, and the state of the switch SW related to a second modified example of the present embodiment. In FIG. 22, the horizontal axis represents time, and the vertical axes represent voltage and rotation frequency, respectively. The waveform g1' represents a temporal variation of the drive signal. The waveform g2 represents a temporal variation of the rotation frequency of the vibration motor 70. The waveform g15" represents the state of the switch SW. Further, the drive signal is configured including the waveform g11 as the start-up signal, the waveform g12" as the rotary drive signal, the waveform g14" in the short-circuit state, and the waveform g13 as the brake signal (the reverse rotation signal).

It should be noted that the waveform g11 is substantially the same as in FIG. 3.

The drive section 60 outputs the electrical power with the voltage value of E2 (the steady operation period voltage value) during the period (T2-T4) from the time t2 to the time t5. It should be noted that the voltage value E2 is smaller than the voltage value E1. Further, the period from the time t1 to the time t2 is shorter than the period from the time t2 to the time t5.

Subsequently, the control section 50A sets the switch SW to the ON state to thereby short the both ends of the vibration motor 70 via the resistor R during the period (T4) from the time t5 to the time t3 before the reverse rotation operation. Thus, the voltage value turns to 0 V. The period T4 corresponds to the specific time period. During the period (T4) from the time t5 to the time t3, the voltage value applied to the vibration motor 70 is 0 V as represented by the waveform g14', and the switch SW is in the ON state as represented by the waveform g15".

Subsequently, the drive section 60 outputs the electrical power with the voltage value of E3 (the reverse rotation period maximum voltage value) during the period (T3) from the time t3 to the time t4. It should be noted that the absolute value of the voltage value E3 is larger than the voltage value E2. Further, the voltage value E3 is higher than the power supply voltage value supplied to the drive section 60.

It should be noted that the period from the time t1 to the time t2 is the period (the first application time) of the start-up, and the drive signal during this period is also the start-up signal (the waveform g11). The period from the time t2 to the time t5 is the rotation period (the second application time), and the drive signal during this period is also the rotary drive signal (the waveform g12"). The period from the time t5 to the time t4 is the stoppage period (the third application time), and is also the short-circuit period of the vibration motor 70. Further, the period from the time t3 to the time t4 is the stoppage period (the third application time), and the drive signal during this period is also the brake signal (the waveform g13). It should be noted that the first application time is shorter than the second application time. Further, the third application time is shorter than the second application time.

It should be noted that the length of the period T3 can also be different from the length of the period T3 shown in FIG. 3.

As described hereinabove, in the second modified example, it is arranged that the both ends of the vibration motor 70 are shorted via the resistor R for the specific time period before the reverse rotation operation.

Thus, it is possible to prevent a high current from flowing in the rapid transition from the normal rotation to the reverse rotation.

Figure 23:
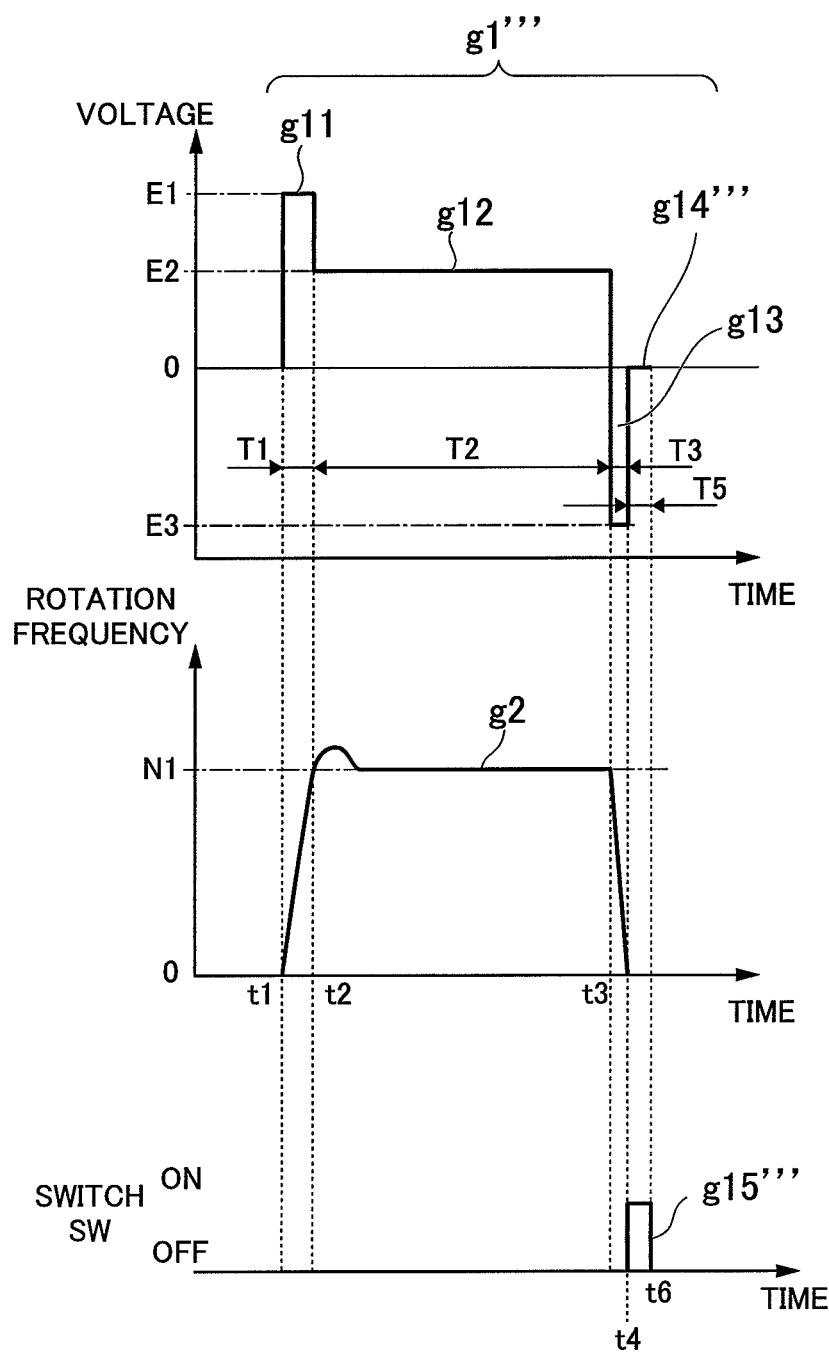
FIG. 23 is a diagram showing an example of a drive signal, the rotation frequency of the vibration motor, and the state of a switch related to a third modified example of the embodiment.

It should be noted that it is also possible for the control section 50A to short the both ends of the vibration motor 70 via the resistor R for a specific time period after the reverse rotation operation as shown in FIG. 23. FIG. 23 is a diagram showing an example of the drive signal, the rotation frequency of the vibration motor 70, and the state of the switch SW related to a third modified example of the present embodiment. In FIG. 23, the horizontal axis represents time, and the vertical axes represent voltage and rotation frequency, respectively. The waveform g1''' represents a temporal variation of the drive signal. The waveform g2 represents a temporal variation of the rotation frequency of the vibration motor 70. The waveform g15''' represents the state of the switch SW. Further, the drive signal is configured including the waveform g11 as the start-up signal, the waveform g12 as the rotary drive signal, the waveform g13 as the brake signal (the reverse rotation signal), and the waveform g14''' of the short-circuit state.

It should be noted that the waveforms g11, g12, and g13 are substantially the same as in FIG. 3.

The drive section 60 outputs the electrical power with the voltage value of E3 (the reverse rotation period maximum voltage value) during the period (T3) from the time t3 to the time t4. It should be noted that the absolute value of the voltage value E3 is larger than the voltage value E2. Further, the voltage value E3 is higher than the power supply voltage value supplied to the drive section 60.

Subsequently, the control section 50A sets the switch SW to the ON state to thereby short the both ends of the vibration motor 70 via the resistor R during the period (T4) from the time t4 to the time t6 after the reverse rotation operation. Thus, the voltage value turns to 0 V. The period T5 corresponds to the specific time period. During the period (T5) from the time t4 to the time t6, the voltage value applied to the vibration motor 70 is 0 V as represented by the waveform g14''', and the switch SW is in the ON state as represented by the waveform g15'''.

It should be noted that the period from the time t1 to the time t2 is the period (the first application time) of the start-up, and the drive signal during this period is also the start-up signal (the waveform g11). The period from the time t2 to the time t3 is the rotation period (the second application time), and the drive signal during this period is also the rotary drive signal (the waveform g12). Further, the period from the time t3 to the time t4 is the stoppage period (the third application time), and the drive signal during this period is also the brake signal (the waveform g13). Further, the period from the time t4 to the time t6 is the stoppage period (the third application time), and is also the short-circuit period of the vibration motor 70. It should be noted that the first application time is shorter than the second application time. Further, the third application time is shorter than the second application time.

It should be noted that the length of the period T3 can also be different from the length of the period T3 shown in FIG. 3.

As described hereinabove, in the third modified example, it is arranged that the both ends of the vibration motor 70 are shorted via the resistor R for the specific time period after the reverse rotation operation.

Thus, it is possible to smoothly stop the reverse rotation operation.

It should be noted that it is also possible to perform the control of the vibration motor 70 (or 201, 301, 401) by recording the program for realizing the functions of the control section 50 and the drive section 60 in the embodiment on a computer-readable recording medium, and then making the computer system retrieve and then execute the program recorded on the recording medium. It should be noted that the "computer system" mentioned here should include an OS and the hardware such as peripheral devices. Further, the "computer system" should also include a WWW system provided with a home page providing environment (or a display environment). Further, the "computer-readable recording medium" denotes a portable recording medium such as a flexible disk, a magneto-optical disk, a ROM, and a CD-ROM, and a storage device such as a hard disk incorporated in the computer system. Further, the "computer-readable recording medium" should include those holding a program for a certain period of time such as a volatile memory (a RAM) in a computer system to be a server or a client in the case of transmitting the program via a network such as the Internet, or a communication line such as a telephone line.

Further, the program described above can be transmitted from the computer system having the program stored in the storage device or the like to another computer system via a transmission medium or using a transmission wave in the transmission medium. Here, the "transmission medium" for transmitting the program denotes a medium having a function of transmitting information such as a network (a communication network) such as the Internet or a communication line (a communication wire) such as a telephone line. Further, the program described above can be for realizing a part of the function described above. Further, the program described above can be a program, which can realize the function described above in combination with a program recorded on the computer system in advance, namely a so-called differential file (a differential program).

What is claimed is:
1. A control device for a vibration generation device, comprising:
a vibration generation device including a stator, and a rotor rotatable around a predetermined axis with respect to the stator and having a weight having a gravity center at a position shifted from the predetermined axis; and
a control section configured to control a start-up period maximum voltage value, which is a maximum voltage value of a drive signal to be applied to the vibration generation device in a start-up period, to become larger than a steady operation period voltage value, which is a voltage value of the drive signal to be applied to the vibration generation device in a steady operation period,
wherein the control section controls a first application time, during which the start-up period maximum voltage value is applied to the vibration generation device, to become shorter than a second application time, during which the steady operation period voltage value is applied to the vibration generation device, selects at least one of a plurality of voltage values as the steady operation period voltage value, and sets the first application time and the second application time based on the steady operation period voltage value selected, and shorts both ends of the vibration generation device for a predetermined period of time, either
(1) at a same time of making the vibration generation device perform a reverse rotation operation in succession to the steady operation, or
(2) before making the vibration generation device perform a reverse rotation operation in succession to the steady operation, or
(3) after making the vibration generation device perform a reverse rotation operation in succession to the steady operation.

2. The control device for the vibration generation device according to claim 1, wherein
in the drive signal to be applied to the vibration generation device in the start-up period, the voltage value to be applied first is lower than the start-up period maximum voltage value.

3. The control device for the vibration generation device according to claim 1, wherein
in the drive signal to be applied to the vibration generation device in the start-up period, the voltage value to be applied first is one of equal to the steady operation period voltage value and higher than the steady operation period voltage value.

4. The control device for the vibration generation device according to claim 1,
wherein the control section comprises a resistor and a switch connected between the both ends of the vibration generation device, and
wherein the control section shorts the both ends of the vibration generation device, via the resistor, by setting the switch to an ON state.

5. An electronic apparatus comprising:
a housing;
a vibration generation device disposed in the housing and including a stator, and a rotor rotatable around a predetermined axis with respect to the stator and having a weight having a gravity center at a position shifted from the predetermined axis; and
a control section disposed in the housing and configured to control a start-up period maximum voltage value, which is a maximum voltage value of a drive signal to be applied to the vibration generation device in a start-up period, to become larger than a steady operation period voltage value, which is a voltage value of the drive signal to be applied to the vibration generation device in a steady operation period,
wherein the control section
controls a first application time, during which the start-up period maximum voltage value is applied to the vibration generation device, to become shorter than a second application time, during which the steady operation period voltage value is applied to the vibration generation device, selects at least one of a plurality of voltage values as the steady operation period voltage value, and sets the first application time and the second application time based on the steady operation period voltage value selected, and shorts both ends of the vibration generation device for a predetermined period of time, either
(1) at a same time of making the vibration generation device perform a reverse rotation operation in succession to the steady operation, or
(2) before making the vibration generation device perform a reverse rotation operation in succession to the steady operation, or
(3) after making the vibration generation device perform a reverse rotation operation in succession to the steady operation.

6. The electronic apparatus according to claim 5,
wherein the control section comprises a resistor and a switch connected between the both ends of the vibration generation device, and
wherein the control section shorts the both ends of the vibration generation device, via the resistor, by setting the switch to an ON state.

7. A method of controlling rotation of a vibration generation device which includes a stator, and a rotor rotatable around a predetermined axis with respect to the stator and having a weight having a gravity center at a position shifted from the predetermined axis, the method comprising:
controlling a start-up period maximum voltage value, which is a maximum voltage value of a drive signal to be applied to the vibration generation device in a start-up period, to become larger than a steady operation period voltage value, which is a voltage value of the drive signal to be applied to the vibration generation device in a steady operation period;
controlling a first application time, during which the start-up period maximum voltage value is applied to the vibration generation device, to become shorter than a second application time, during which the steady operation period voltage value is applied to the vibration generation device;
selecting at least one of a plurality of voltage values as the steady operation period voltage value; and
setting the first application time and the second application time based on the steady operation period voltage value selected; and
shorting both ends of the vibration generation device for a predetermined period of time, either
(1) at a same time of making the vibration generation device perform a reverse rotation operation in succession to the steady operation, or
(2) before making the vibration generation device perform a reverse rotation operation in succession to the steady operation, or
(3) after making the vibration generation device perform a reverse rotation operation in succession to the steady operation.

8. The method of controlling rotation of the vibration generation device according to claim 7,
wherein the both ends of the vibration generation device are connected via a resistor and a switch, and
wherein the shorting of the both ends of the vibration generation device is performed, via the resistor, by setting the switch to an ON state.

* * * * *